(12) United States Patent
Howe et al.

(10) Patent No.: US 12,133,572 B1
(45) Date of Patent: Nov. 5, 2024

(54) ARTICLE OF FOOTWEAR

(71) Applicant: Under Armour, Inc., Baltimore, MD (US)

(72) Inventors: Justin Howe, Baltimore, MD (US); Greg A. Newman, Baltimore, MD (US); Bjorn Begelman, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 330 days.

(21) Appl. No.: 17/592,931

(22) Filed: Feb. 4, 2022

Related U.S. Application Data

(62) Division of application No. 15/924,451, filed on Mar. 19, 2018, now abandoned.
(Continued)

(51) Int. Cl.
*B29D 35/00* (2010.01)
*A43B 5/00* (2022.01)
(Continued)

(52) U.S. Cl.
CPC ............ *A43B 23/026* (2013.01); *A43B 5/00* (2013.01); *A43B 5/06* (2013.01); *A43B 7/06* (2013.01); *A43B 23/0215* (2013.01); *A43B 23/0235* (2013.01); *A43B 23/027* (2013.01); *A43B 23/0295* (2013.01); *B29C 43/146* (2013.01);
(Continued)

(58) Field of Classification Search
CPC ..... A43B 23/026; A43B 23/0235; A43B 5/06; A43B 23/0215; A43B 5/00; A43B 7/06; A43B 23/027; A43B 23/0295; B32B 5/245; B32B 5/18; B32B 27/12; B32B 5/02; B32B 37/10; B32B 37/182; B32B 27/065; B32B 27/40; B32B 37/06; B32B 37/28; B32B 38/0004; B29D 35/146; B29D 35/0054
See application file for complete search history.

(56) References Cited

U.S. PATENT DOCUMENTS 1,772,179 A  8/1930 Finkelstein
1,867,679 A  7/1932 Riehle et al.
(Continued)

FOREIGN PATENT DOCUMENTS

DE  1931800 A1  3/1970
DE  4401849 A1  8/1994
(Continued)

OTHER PUBLICATIONS

Extended European Search Report dated Mar. 21, 2017 cited in EP Application 14835903.7.
(Continued)

*Primary Examiner* — Mathieu D Vargot
(74) *Attorney, Agent, or Firm* — Edell, Shapiro & Finnan, LLC

(57) ABSTRACT

An article of footwear includes a sole structure and an upper secured to the sole structure. The upper includes a first portion forming the hindfoot section of the upper and a second portion forming the forefoot section of the upper. The first portion is a textile laminate including an inner layer facing the cavity, an outer layer forming an exterior of the shoe, and an intermediate layer disposed between inner and outer layers. The second portion is textile possessing a unitary knit construction.

19 Claims, 13 Drawing Sheets

Related U.S. Application Data

(60) Provisional application No. 62/472,826, filed on Mar. 17, 2017.

(51) Int. Cl.

| | | |
|---|---|---|
| *A43B 5/06* | (2022.01) | |
| *A43B 7/06* | (2006.01) | |
| *A43B 23/02* | (2006.01) | |
| *B29C 43/14* | (2006.01) | |
| *B29C 43/18* | (2006.01) | |
| *B29C 43/20* | (2006.01) | |
| *B29C 43/52* | (2006.01) | |
| *B29D 35/14* | (2010.01) | |
| *B32B 5/02* | (2006.01) | |
| *B32B 5/18* | (2006.01) | |
| *B32B 5/24* | (2006.01) | |
| *B32B 27/06* | (2006.01) | |
| *B32B 27/12* | (2006.01) | |
| *B32B 27/40* | (2006.01) | |
| *B32B 37/06* | (2006.01) | |
| *B32B 37/10* | (2006.01) | |
| *B32B 37/18* | (2006.01) | |
| *B32B 37/28* | (2006.01) | |
| *B32B 38/00* | (2006.01) | |
| *D04B 1/24* | (2006.01) | |
| *A43B 13/16* | (2006.01) | |
| *A43B 13/22* | (2006.01) | |
| *A43B 13/38* | (2006.01) | |
| *B29L 31/50* | (2006.01) | |
| *B32B 37/04* | (2006.01) | |

(52) U.S. Cl.
CPC .............. *B29C 43/18* (2013.01); *B29C 43/20* (2013.01); *B29C 43/52* (2013.01); *B29D 35/0054* (2013.01); *B29D 35/146* (2013.01); *B32B 5/02* (2013.01); *B32B 5/18* (2013.01); *B32B 5/245* (2013.01); *B32B 27/065* (2013.01); *B32B 27/12* (2013.01); *B32B 27/40* (2013.01); *B32B 37/06* (2013.01); *B32B 37/10* (2013.01); *B32B 37/182* (2013.01); *B32B 37/28* (2013.01); *B32B 38/0004* (2013.01); *D04B 1/24* (2013.01); *A43B 13/16* (2013.01); *A43B 13/22* (2013.01); *A43B 13/38* (2013.01); *B29C 2043/189* (2013.01); *B29K 2713/00* (2013.01); *B29L 2031/50* (2013.01); *B32B 37/04* (2013.01); *B32B 2250/24* (2013.01); *B32B 2262/0207* (2013.01); *B32B 2262/0276* (2013.01); *B32B 2266/0221* (2013.01); *B32B 2266/0278* (2013.01); *B32B 2266/06* (2013.01); *B32B 2305/022* (2013.01); *B32B 2305/18* (2013.01); *B32B 2307/546* (2013.01); *B32B 2307/724* (2013.01); *B32B 2331/04* (2013.01); *B32B 2367/00* (2013.01); *B32B 2371/00* (2013.01); *B32B 2375/00* (2013.01); *B32B 2437/02* (2013.01); *D10B 2401/061* (2013.01); *D10B 2501/043* (2013.01)

(56) References Cited

U.S. PATENT DOCUMENTS

| | | | |
|---|---|---|---|
| 3,642,563 | A | 2/1972 | Davis et al. |
| 3,694,940 | A | 10/1972 | Stohr |
| 3,967,390 | A | 7/1976 | Anfruns |
| 4,294,022 | A | 10/1981 | Stockli et al. |
| 4,451,996 | A | 6/1984 | Norton et al. |
| 4,717,621 | A | 1/1988 | So et al. |
| 5,187,883 | A | 2/1993 | Penney |
| 5,339,544 | A | 8/1994 | Caberlotto |
| 5,913,592 | A | 6/1999 | Moore |
| 6,076,283 | A | 6/2000 | Boie |
| 6,173,511 | B1 | 1/2001 | Perrault |
| 6,299,962 | B1 | 10/2001 | Davis et al. |
| 6,558,784 | B1 | 5/2003 | Norton et al. |
| 6,670,029 | B2 | 12/2003 | Norton et al. |
| 6,805,610 | B2 | 10/2004 | Luk |
| 6,931,762 | B1 * | 8/2005 | Dua .................. D04B 9/26 66/185 |
| 7,082,703 | B2 | 8/2006 | Greene |
| 7,316,083 | B2 | 1/2008 | Labonte |
| 7,533,479 | B2 | 5/2009 | LaBonte |
| 7,650,705 | B2 | 1/2010 | Donnadieu et al. |
| 7,739,810 | B2 | 6/2010 | Luekecke et al. |
| 7,793,434 | B2 | 9/2010 | Sokolowski et al. |
| 7,805,860 | B2 | 10/2010 | Fliri |
| 8,321,984 | B2 | 12/2012 | Dojan et al. |
| 8,434,245 | B2 | 5/2013 | Bell et al. |
| 8,544,191 | B2 | 10/2013 | Marvin et al. |
| 8,769,846 | B1 | 7/2014 | Williams |
| 9,101,179 | B2 | 8/2015 | Marvin et al. |
| 11,059,249 | B2 * | 7/2021 | Krichevsky .......... B29D 35/126 |
| 2002/0071946 | A1 | 6/2002 | Norton et al. |
| 2002/0077014 | A1 | 6/2002 | Gabbrielli |
| 2003/0172555 | A1 | 9/2003 | Chu |
| 2004/0064975 | A1 | 4/2004 | Huff |
| 2005/0081406 | A1 | 4/2005 | Hoffer et al. |
| 2005/0274040 | A1 | 12/2005 | Fuerst |
| 2006/0112594 | A1 | 6/2006 | Kilgore |
| 2007/0011915 | A1 | 1/2007 | Allen |
| 2007/0144039 | A1 | 6/2007 | Fliri |
| 2007/0199210 | A1 | 8/2007 | Vattes et al. |
| 2007/0204485 | A1 | 9/2007 | Kilgore |
| 2008/0000106 | A1 | 1/2008 | Culpepper |
| 2008/0028544 | A1 | 2/2008 | Park |
| 2008/0028635 | A1 | 2/2008 | Park |
| 2008/0086913 | A1 | 4/2008 | Nawachi et al. |
| 2008/0127426 | A1 | 6/2008 | Morlacchi et al. |
| 2008/0141469 | A1 | 6/2008 | Park |
| 2008/0250668 | A1 | 10/2008 | Marvin et al. |
| 2009/0013555 | A1 | 1/2009 | Vitulli |
| 2009/0077833 | A1 | 3/2009 | Kokavec |
| 2009/0293318 | A1 | 12/2009 | Garneau et al. |
| 2010/0115792 | A1 | 5/2010 | Muller |
| 2010/0133715 | A1 | 6/2010 | Park |
| 2010/0139853 | A1 | 6/2010 | Park |
| 2010/0170106 | A1 | 7/2010 | Brewer et al. |
| 2010/0186255 | A1 | 7/2010 | Avar et al. |
| 2010/0205716 | A1 | 8/2010 | Kim |
| 2011/0005105 | A1 | 1/2011 | Hong |
| 2011/0078922 | A1 | 4/2011 | Cavaliere et al. |
| 2011/0088282 | A1 | 4/2011 | Dojan et al. |
| 2011/0119956 | A1 | 5/2011 | Borel et al. |
| 2011/0214313 | A1 | 9/2011 | Dervin et al. |
| 2011/0265347 | A1 | 11/2011 | Leary et al. |
| 2011/0265348 | A1 | 11/2011 | Schmutte |
| 2011/0308108 | A1 | 12/2011 | Berns et al. |
| 2012/0000094 | A1 | 1/2012 | Fliri |
| 2012/0144699 | A1 | 6/2012 | Eggert et al. |
| 2012/0216424 | A1 | 8/2012 | Lyden |
| 2012/0272548 | A1 | 11/2012 | Downard |
| 2012/0285039 | A1 | 11/2012 | Lazaris |
| 2012/0297645 | A1 | 11/2012 | Berbert |
| 2013/0008053 | A1 | 1/2013 | Nishiwaki et al. |
| 2013/0036629 | A1 | 2/2013 | Bramani |
| 2013/0047471 | A1 | 2/2013 | Liang |
| 2013/0097891 | A1 | 4/2013 | Moretti et al. |
| 2013/0232820 | A1 | 9/2013 | Bramani |
| 2013/0251955 | A1 | 9/2013 | Lee et al. |
| 2013/0291293 | A1 | 11/2013 | Jessiman et al. |
| 2013/0291400 | A1 | 11/2013 | Rammig |
| 2013/0303041 | A1 | 11/2013 | Kim |
| 2013/0340289 | A1 | 12/2013 | Thevenoud |
| 2014/0059886 | A1 | 3/2014 | Lyttle et al. |
| 2014/0082961 | A1 | 3/2014 | Marvin et al. |
| 2014/0115922 | A1 | 5/2014 | Marvin et al. |
| 2014/0130270 | A1 | 5/2014 | Baudouin et al. |
| 2014/0173932 | A1 | 6/2014 | Bell |

(56) References Cited

U.S. PATENT DOCUMENTS

| | | |
|---|---|---|
| 2014/0230284 A1 | 8/2014 | Craig et al. |
| 2014/0246147 A1 | 9/2014 | Hernandez Hernandez |
| 2014/0283410 A1 | 9/2014 | Marvin |
| 2015/0101134 A1 | 4/2015 | Manz et al. |
| 2015/0223567 A1 | 8/2015 | Lee et al. |
| 2017/0273404 A1* | 9/2017 | Doenges ............ A43B 23/0215 |
| 2018/0049517 A1 | 2/2018 | Bell |

FOREIGN PATENT DOCUMENTS

| | | |
|---|---|---|
| EP | 0152033 A1 | 8/1985 |
| EP | 0769258 A1 | 4/1997 |
| EP | 1415558 A | 5/2004 |
| FR | 2180146 A5 | 11/1973 |
| GB | 2480641 A | 11/2011 |
| JP | 11032805 | 2/1999 |
| JP | 2011045701 | 3/2011 |
| KR | 20090003694 A | 1/2009 |
| WO | 1999003744 A1 | 4/1990 |
| WO | 9943229 A1 | 9/1999 |
| WO | 2007038487 A2 | 4/2007 |

OTHER PUBLICATIONS

International Search Report PCT/US2014/050900, mailed Jan. 22, 2015.

* cited by examiner

ARTICLE OF FOOTWEAR

CROSS-REFERENCE TO RELATED APPLICATIONS

This application is a divisional of U.S. application Ser. No. 15/924,451, entitled "ARTICLE OF FOOTWEAR," and filed on Mar. 19, 2018, now abandoned, which claims priority under 35 U.S.C. 119(e) to U.S. Provisional Patent Application Ser. No. 62/472,826, entitled "ARTICLE OF FOOTWEAR UPPER WITH TEXTILE PORTION AND THERMOFORMED PORTION", filed Mar. 17, 2017, the disclosures of which are incorporated herein by reference in its entirety for all purposes.

FIELD OF THE INVENTION

The present invention relates to an article of footwear and, in particular, to the construction of the upper of the article of footwear.

BACKGROUND

An article of footwear such as a running shoe is designed for comfort and durability. An article of footwear is typically constructed from a material or a combination of materials having insulative, moisture resistant, and/or abrasion resistant characteristics. The processes for constructing performance footwear can be both labor and time intensive, often requiring sophisticated and expensive stitching and/or injection molding equipment. Accordingly, it would be desirable to be able to construct these uppers via a rapid and uniform production process that minimizes waste.

SUMMARY OF THE INVENTION

An article of footwear includes a sole structure and an upper. The upper is a hybrid upper including a thermoformed portion and a strand portion. The thermoformed portion includes a seamless fabric laminate including fused fabric and foam layers. The strand portion includes strands knitted in a series of courses and wales. A transition area couples the thermoformed portion to the strand portion. In an embodiment, the transition area is a textile bridge operable to adhere to each portion. The resulting hybrid upper provides heel support while enhancing the comfort and breathability of the shoe.

In an embodiment, an article of footwear includes a sole structure and an upper. The upper may be secured to the sole structure. The article of footwear may further includes a hindfoot section, a midfoot section, and a forefoot section. The hindfoot, midfoot, and forefoot sections may cooperate to define a cavity operable to receive a foot of a wearer of the article of footwear. The upper may include a first laminate and a second textile portion. The first laminate portion may be disposed in at least the hindfoot section. The second textile portion may be disposed in at least the forefoot and midfoot sections.

In yet another embodiment, an article of footwear includes a sole structure and an upper. The upper is coupled to the sole structure such that the upper and sole structure collectively define a cavity for receiving a foot. The upper further includes a textile portion and a compression molded laminate portion. The textile portion may form at least the toebox, the medial quarter, and the lateral quarter of the upper. The compression molded laminate portion may form at least the heel cup of the upper.

A method for constructing an article of footwear includes constructing a textile portion and a compression laminate portion. The textile portion is first constructed by forming a knit structure having a first degree of elongation along a width dimension of the knit structure and a second degree of elongation along a length dimension of the knit structure, the first degree of elongation being greater than the second degree of elongation. The knit structure may be a circular knit structure. A plurality of patterned upper structures are removed from the knit structure, where each patterned upper structure may include a medial side, an opposite lateral side, a medial edge disposed on the medial side, and a lateral edge disposed on the lateral side. Furthermore, each patterned upper structure may be removed from the knit structure so that the first degree of elongation extends along a direction spanning from the medial side to the lateral side. One of the plurality of patterned upper structures may then be shaped to form the textile portion of an upper of the article of footwear. The compression laminate portion is formed by first combining a plurality of fabric layers within a mold. A structural support member may be disposed between the plurality of fabric layers. The fabric layers may then be compression molded to form the compression molded laminate portion of the upper. The laminate portion may also include a medial side, an opposite lateral side, a medial edge disposed on the medial side, and a lateral edge disposed on the lateral side. The upper may be formed by coupling the laminate portion to the textile portion. The medial edge of the laminate portion may be coupled to the medial edge of the textile portion, while the lateral edge of the laminate portion may be coupled to the medial edge of the textile portion. Once formed, the upper may then be coupled to the sole structure of the article of footwear.

The above and still further features and advantages of the present invention will become apparent upon consideration of the following detailed description of specific embodiments thereof.

1, where the structures are to be removed from the textile structures in accordance with example embodiments of the present invention.

Figure 7A:
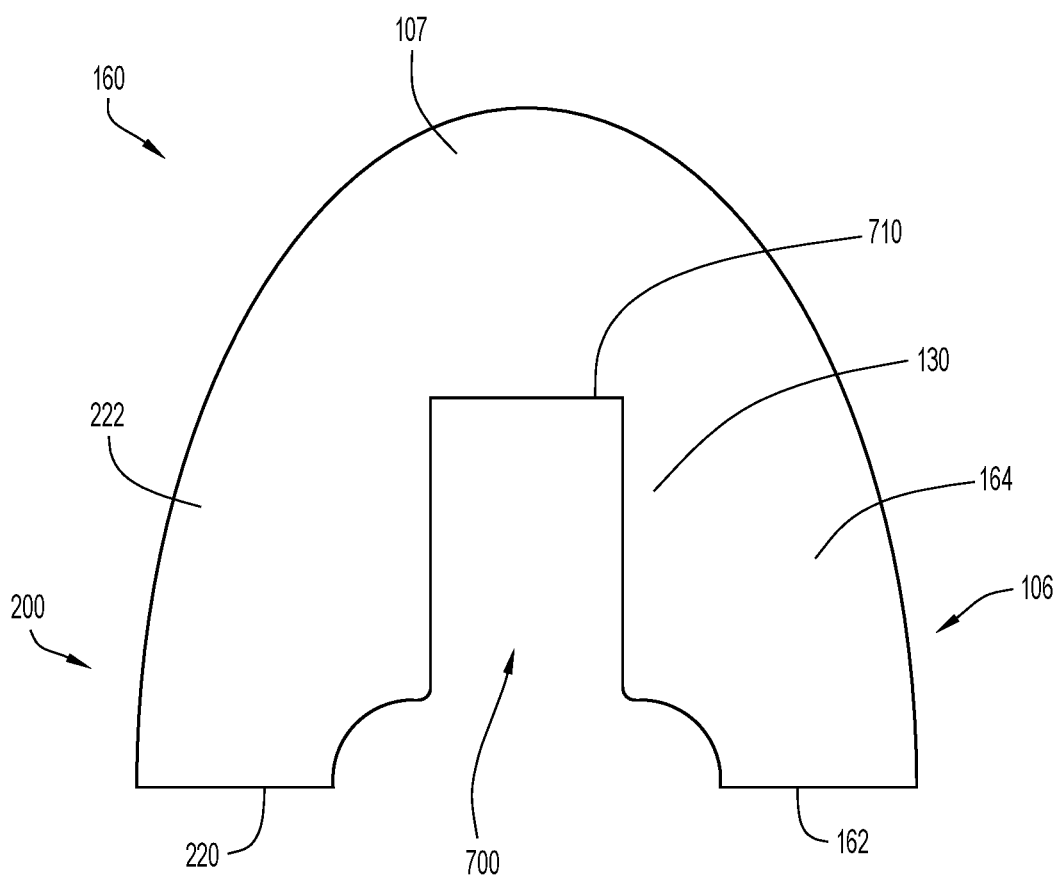
FIG. 7A is a planar view of the second portion of the upper of the article of footwear shown in FIG. 1.
Figure 7B:
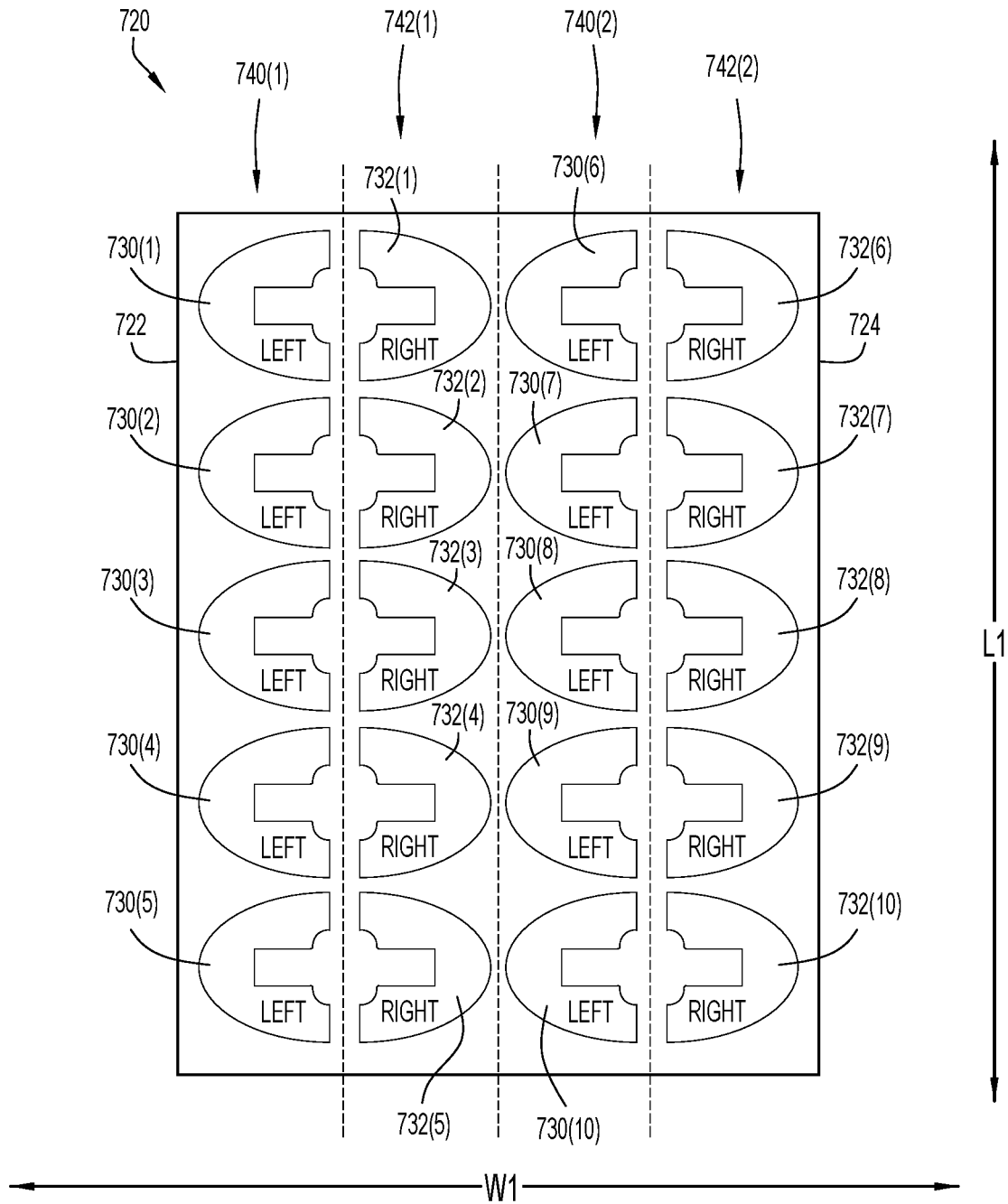
FIGS. 7B and 7C depict textile structures including boundary lines marked on surfaces of the structures, the boundary lines defining structures that form the second portion of the upper of the article of footwear shown in FIG.
Figure 7C:
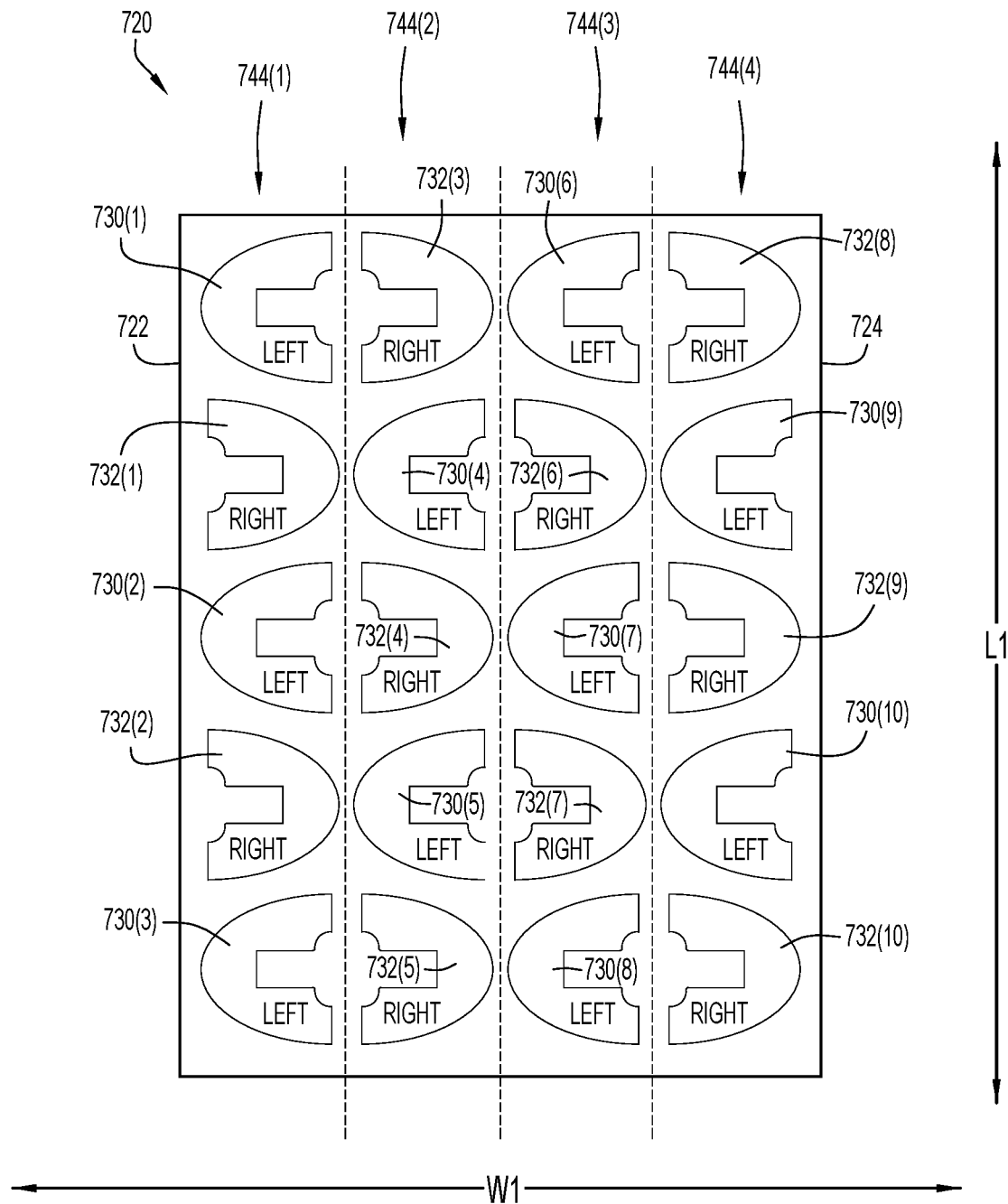
Figure 7D:
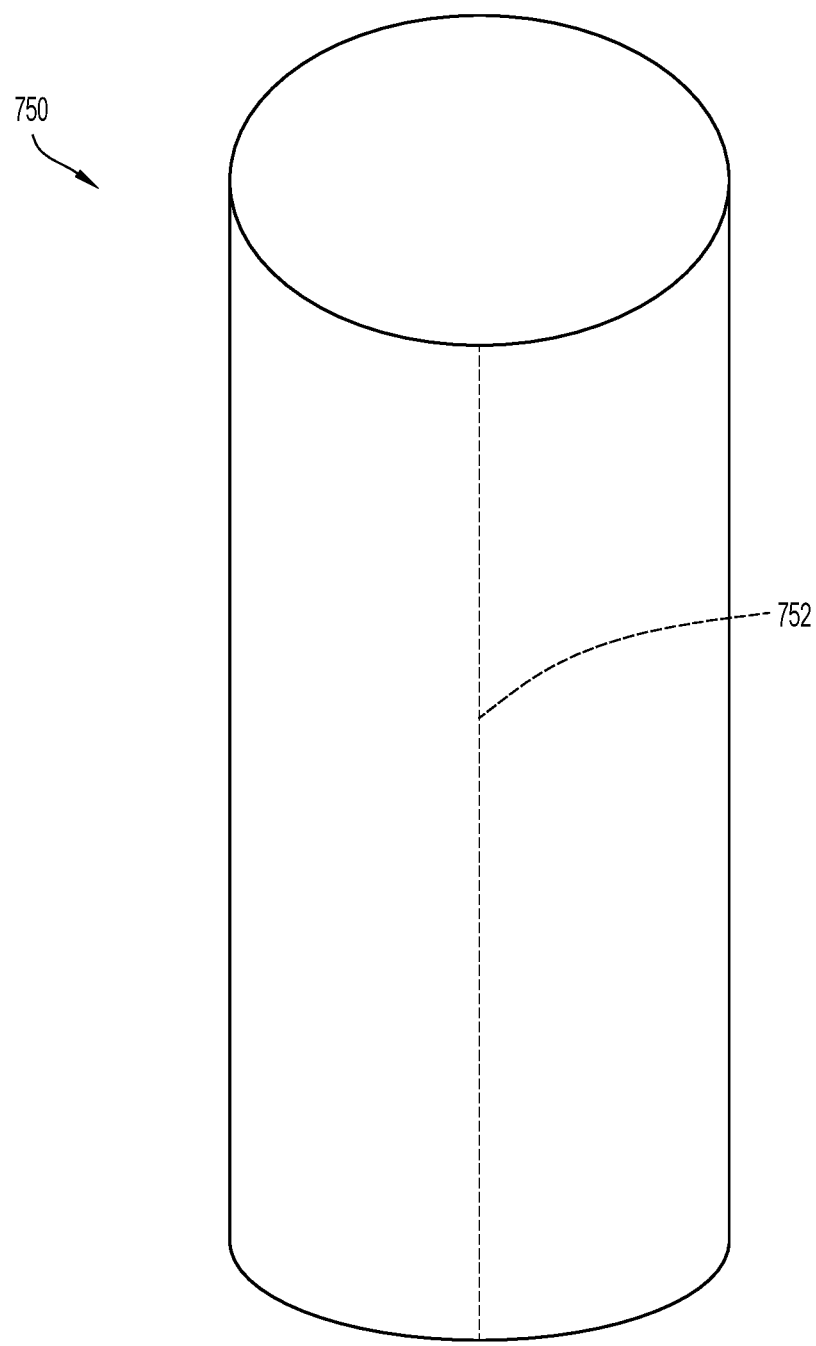

FIG. 7D depicts an example embodiment of a circular knit structure for use in forming the textile structures of FIGS. 7B and 7C via a speed forming process in accordance with example embodiments of the invention.

Figure 1:
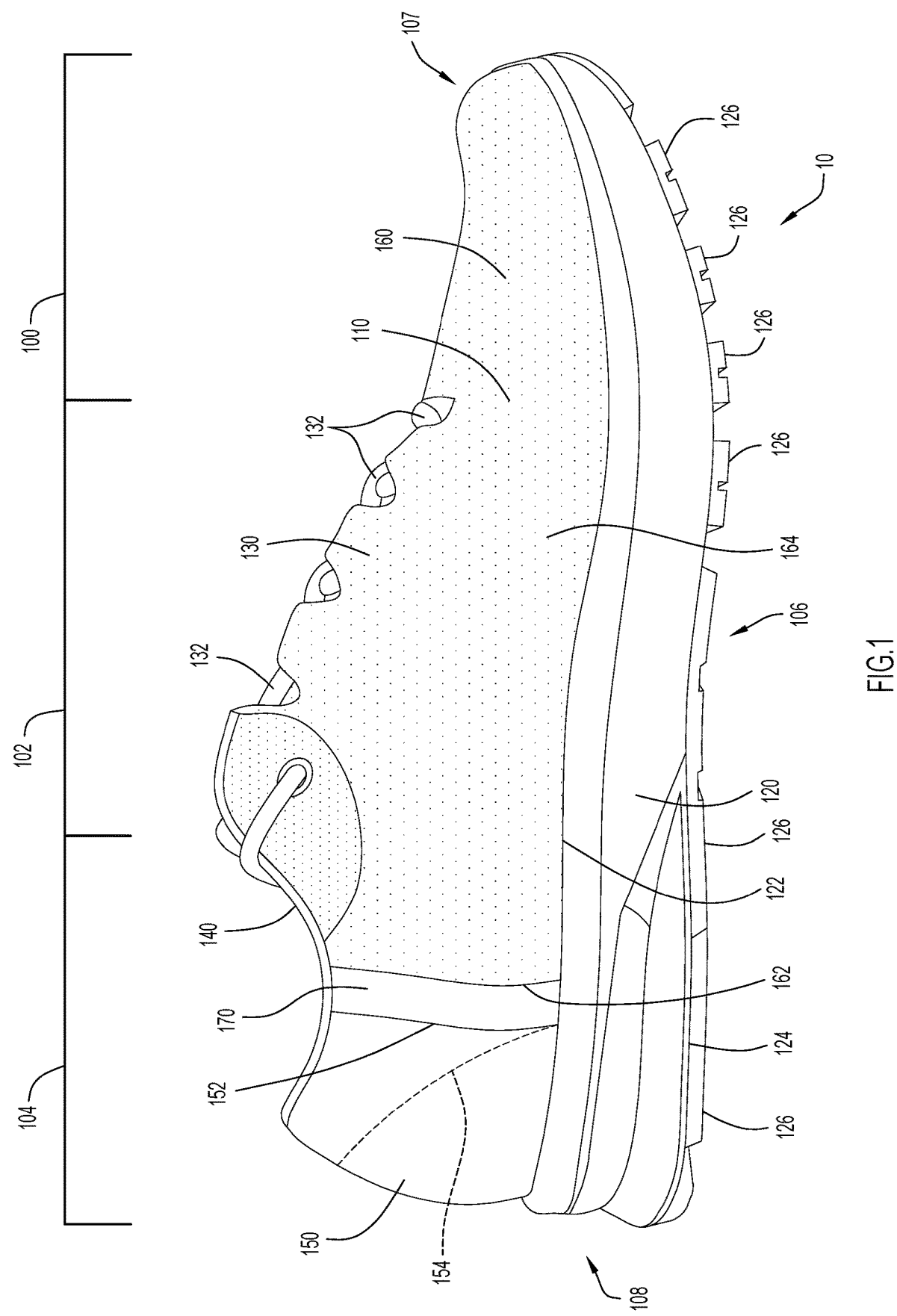
FIG. 1 is a side view in elevation of the medial side an article of footwear in accordance with an embodiment of the invention (footwear configured for a left foot).
Figure 7E:
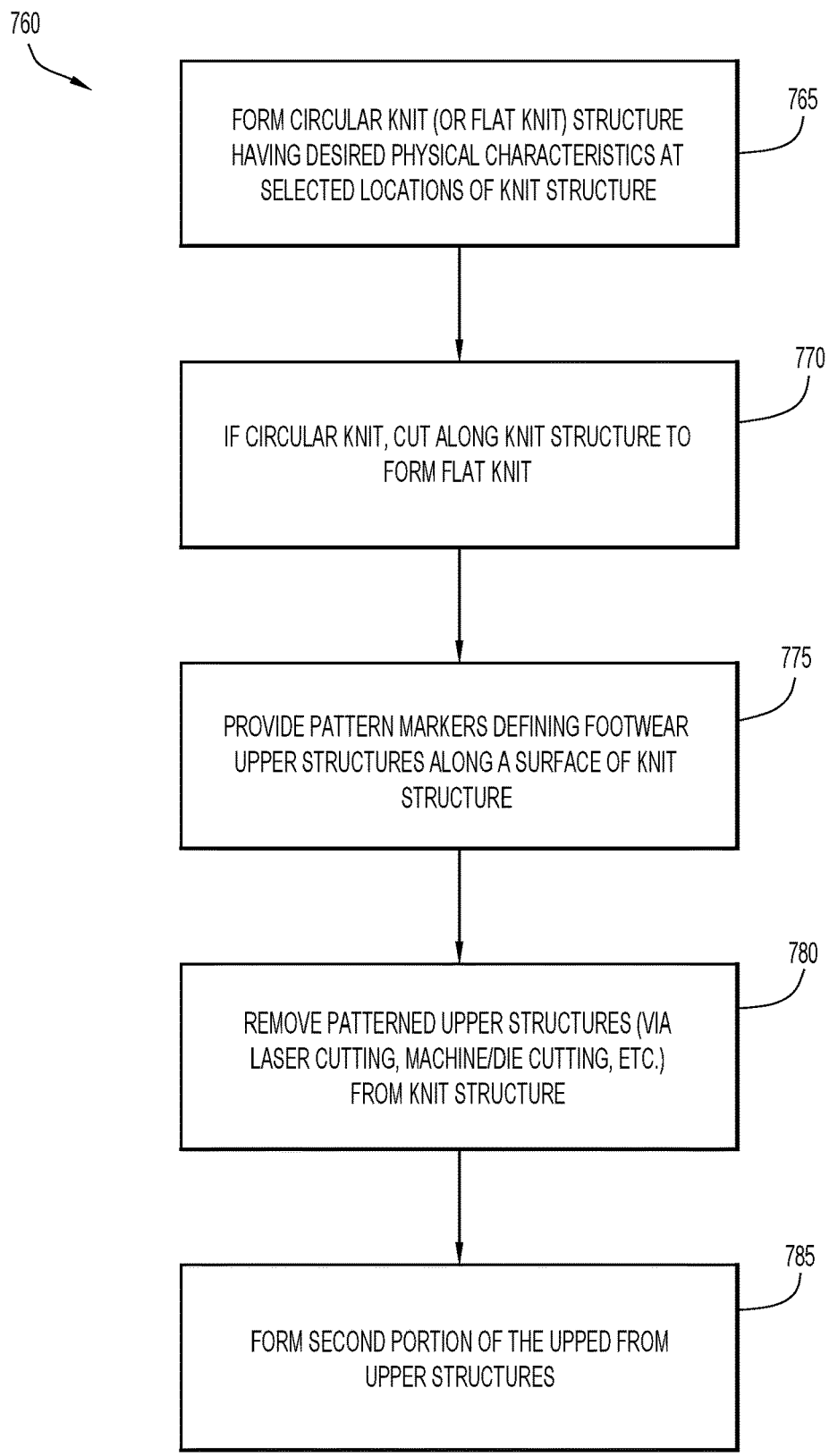

FIG. 7E is a flowchart depicting an example process for forming the second portion of the upper of the article of footwear illustrated in FIG. 1 from the textile upper structures illustrated in FIGS. 7B and 7C in accordance with example embodiments of the present invention.

Like reference numerals have been used to identify like elements throughout this disclosure.

DETAILED DESCRIPTION

In the following detailed description, reference is made to the accompanying figures which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The terms "comprising," "including," "having," and the like, as used with respect to embodiments of the present disclosure, are synonymous.

As described herein with reference to the example embodiment of FIGS. 1-4, an article of footwear 10 in accordance with the invention includes an upper 110 coupled with a sole structure 120. The article of footwear 10, also referred to herein as a shoe, can be in the form of a running shoe or other type of athletic shoe. The article of footwear 10 defines several regions corresponding with various parts of a foot. Specifically, the shoe 10 defines a forward footwear or forefoot region 100 disposed forward of intermediate region and generally corresponding to the forefoot (e.g., the toes of the foot), an intermediate footwear or midfoot region 102 disposed rearward from the forward region 100 and generally corresponding to the midfoot (e.g., the arched, instep, and ball areas of the foot), and a rear footwear or hindfoot region 104 generally corresponding with the rear of the foot (e.g., the hindfoot including the heel and ankle areas of the foot). The article of footwear 10 includes a medial side 106 (which corresponds with the medial side of the upper 110) that is oriented along the medial or big toe side of the user's foot, a lateral side 200 (which corresponds with the lateral side of the upper 110) that is oriented along the lateral or little toe side of the user's foot, a toe (i.e., front) end 107 (also referred to as a toe cage or toe box) that corresponds with the toe end of the user's foot, and a heel (i.e., rear) end 108 that corresponds with the heel of the foot. Proximate the heel end 108, the upper 110 has a curved shape defining a heel cup that generally conforms to the user's heel and extends between the medial and lateral sides 106, 200 of the article of footwear 10. The upper 110 further includes an instep 130 disposed in the midfoot region 102 and positioned between the medial and lateral sides 106, 200, where the instep 130 extends over the instep of the foot and generally includes a tongue 300. The upper 110 also includes a fastener 132 disposed at the instep 130, where the fastener 132 (e.g., laces, strands, cords, strings, etc.) is disposed over the tongue 300.

While the example embodiments depicted in the figures show an article of footwear (shoe) configured for a left foot, it is noted that the same or similar features can also be provided for an article of footwear (shoe) configured for a right foot (where such features of the right footed shoe are reflection or "mirror image" symmetrical in relation to the left footed shoe).

The upper 110 defines a cavity 400 that receives the foot. Specifically, the heel end 108, lateral side 200, medial side 106, instep 130, and toe cage 107 cooperate to define an interior cavity 400 into which a foot is inserted by way of an access opening or collar 140. The collar 140 may be finished with, e.g., fabric tape applied via adhesive.

The upper 110 may possess any dimensions (size/shape) suitable for its described purpose. For example, the upper 110 may possess a "high top" configuration, in which a heel end 108 of the upper 110 extends over and/or above at least a portion of a user's ankle. Alternatively, the upper 110 may possess a "mid top" configuration (in which the upper 110 extends to slightly below or at the user's ankle), a low top configuration, or any other suitable configuration. As further detailed below, the upper 110 can be coupled to the sole structure 120 in any suitable manner (e.g., via a strobel or, when no strobel is required due to an enclosed or sock-like configuration of the upper, via direct connection between a lower portion of the upper and an upper portion of the sole structure), where such coupling can be achieved in any conventional and/or other suitable manner (e.g., via any form of adhesion or bonding, via stitching, via one or more types of fasteners, etc.).

The sole structure 120 comprises a durable, wear-resistant component configured to provide cushioning as the shoe 10 impacts the ground. In certain embodiments, the sole structure 120 may include a midsole and an outsole. In additional embodiments, the sole structure 120 can further include an insole or sockliner that is disposed within the foot cavity when the shoe 10 is assembled. In other embodiments, the sole structure 120 may be a unitary and/or one-piece structure. The sole structure 120 includes an upper facing side, upper facing portion, or top surface 122 that is configured to secure with the upper and an opposing ground-facing side 124 that defines a generally planar surface and can further be textured and/or include ground-engaging or traction elements 126 (e.g., as part of an outsole of the sole structure) to enhance traction of the shoe 10 on different types of terrains and depending upon a particular purpose in which the shoe is to be implemented. The ground-facing side 124 of the sole structure 120 can also include one or more recesses formed therein, such as indentations or grooves extending in a lengthwise direction of the sole structure 120 and/or transverse the lengthwise direction of the sole structure, where the recesses can provide a number of enhanced properties for the sole structure (e.g., flexure/pivotal bending along grooves to enhance flexibility of the sole structure during use). The sole structure 120 may be formed of a single material or may be formed of a plurality of materials. In example embodiments in which the sole structure 120 includes a midsole and an outsole, the midsole may be formed of one or more materials including, without limitation, ethylene vinyl acetate (EVA), an EVA blended with one or more of an EVA modifier, a polyolefin block copolymer, and a triblock copolymer, and a polyether block amide (e.g., a PEBAX® material). The outsole may be formed of one or more materials including, without limitation, elastomers (e.g., thermoplastic polyurethane), siloxanes, natural rubber, and synthetic rubber.

The upper 110 is formed with a hybrid structure including a molded laminate section and a knit section having a unitary knit construction. Each section is selectively located to provide targeted areas of support and flexibility based upon the end use of the shoe (running, training, weight lifting, etc.) In the embodiment illustrated in FIGS. 1-3, the upper 110 includes a first laminate portion 150 and a second knit portion 160. Along the interface between the portions 150, 160 is a transition or bridging structure 170, which includes a structure common to both portions that serves to couple (e.g., connect) the portions. The first portion 150 is disposed within the rear footwear region 104 and generally covers the heel end 108 of the foot as well as portions of the medial and lateral sides 106, 200 of the upper 110 proximate to the heel end 108. In one embodiment, the first portion 150 is formed as a seamless, stitchless heel cup with a medial end or edge 152 disposed on the medial side 106 of the article of footwear 10 and a lateral end or edge 210 disposed on the lateral side 200 of the article of footwear 10.

The second portion 160 extends from the forward footwear region 100, through the intermediate footwear region 102, and at least partially into the rear footwear region 104. The second portion 160 defines the vamp, including toe cage 107, of the article of footwear 10. The second portion 160 further includes a medial wing or medial quarter 164 and a lateral wing or lateral quarter 222 that extend rearward from the toe cage 107 along the medial and lateral sides 106, 220, respectively, so as to abut (and/or at least partially overlap) the first portion 150. The medial wing 164 and the lateral wing 222 define the medial and lateral sides 106, 200, respectively, of the second portion 160 of the upper 110. The second portion 160 further includes a medial end or edge 162 disposed on the medial side 106 of the article of footwear 10 and a lateral end or edge 220 disposed on the lateral side 200 of the article of footwear 10. Thus, the medial wing 164 and the lateral wing 222 extend rearward from the toe cage 107 to the medial end 162 and the lateral end 220, respectively. As further illustrated in FIGS. 1-3, the second portion 160 of the upper 110 includes, at the instep 130, a plurality of medial side fastener engaging elements 310 and a plurality of lateral side fastener engaging elements 312. The fastener engaging elements 310, 312 are positioned along the instep 130, where each fastener engaging element 310, 312 comprises a looped segment of material that includes an opening configured to receive and retain a portion of the fastener 132.

The medial end 162 of the second portion 160 is coupled to the medial end 152 of the first portion 150 via the bridge structure (also called a coupling element) 170 at a location on the medial side 106 and in the rear footwear region 104 of the article of footwear 10. Similarly, lateral end 220 of the second portion 160 is coupled to the lateral end 210 of the first portion 150 via a bridge structure 170 at a location on the lateral side 200 and in the rear footwear region 104 of the article of footwear 10. In an example embodiment, each end 152, 210 of the first portion 150 abuts (to form contiguous interior and/or exterior surfaces) or overlaps the corresponding end 162, 220 of the second portion 160, defining a joint or seam line (the groove or ridge caused by abutting or overlapping edges). The bridge structure 170, then, begins within the first portion 150, crosses the joint, and extends into the second portion 160 (or vice versa). For example, a stitch matrix may be utilized including insertion stitches that pass from the exterior side to the interior side of the upper (e.g., a zigzag stitch or an embroidered stitch including interlocked top and bobbin threads).

Further, a skin layer may be used as the bridge structure or coupling member 170. Various materials may be utilized to form skin layer, including a polymer film, leather, a woven textile, a non-woven textile, or a metal foil. By way of specific example, a thermoplastic film or a composite structure including textile with a thermoplastic film or other heat sensitive adhesive. The textile includes knit, woven, and nonwoven constructions. The textile may include elastic strands and/or inelastic strands (described in greater detail below). The thermoplastic film is formed of a polymer (e.g., an elastomer) possessing a melting and/or glass transition point at which the solid polymer liquefies, generating viscous flow (i.e., becomes molten). The polymer includes polyurethane, polyamide, polyester, nylon, polyolefin, vinyl, polypropylene, and/or acrylic. The thermoplastic film is fusible melting at a temperature below the melting temperature of the yarn forming the first portion, the second portion, or the textile backing, flowing between the strands of the first and second portions and then forming a bond upon hardening.

The skin layer is resilient and, as such, it is capable of tempering any difference in modulus between the first portion 150 and second portion 160. That is, when the first portion 150 possess a lower stretch and/or recovery value than the second portion 160 (or vice versa), the skin layer remains capable of securing across the seam, stabilizing the portions. Additionally, the skin layer may provide benefits such as reinforcement of the seam line, water resistance, and abrasion resistance. For example, the skin layer may inhibit stretch in the knit construction, moderating the degree of stretch permitted in the area of the upper proximate the seam.

The textile may further be a flocked composite including an adhesive film and layer of flocking. The flock material may be any suitable for its described purpose. In general, flock is fragments of textile fibers. The flock material may be precision cut flock, where all fiber lengths are approximately equal, or random cut flock, where the fibers are ground or chopped to produce a broad range of lengths. A combination of flock types may also be utilized. The flock fibers may be formed of any material suitable for their described purpose. In general, the fibers forming the flock material are natural fibers such as cellulosic fibers (e.g., cotton, bamboo) or protein fibers (e.g., wool, silk, and soybean) and/or synthetic fibers formed of one or more types of polymers such as polyester, nylon, polypropylene, polyethylene, acrylics, acetate, polyacryonitrile, and combinations thereof.

The flock fibers, moreover, may be selected or modified/treated such that they possess one or more desired properties. By way of example, the flock fibers may be hydrophilic, hydrophobic, swellable, or a combination thereof. By way of specific examples, the flock fibers may include bicomponent fibers, polypropylene fibers, and polyester fibers that have been treated with surfactants; hydrophilic fibers such as rayon fibers, acrylic fibers, nylon fibers, polyvinyl alcohol fibers, and natural or regenerated cellulosics.

The fibers of the flock material may possess any denier and any length suitable for its described purpose. By way of example, the fibers of the flock material may possess a length of from approximately 0.1 millimeters to approximately 5 millimeters. Additionally, the fibers of the flock material may possess a denier of from approximately 0.5 to approximately 25. One suitable material for the flock material is a 1.5 denier nylon fiber having a length of approximately 0.5 millimeters.

In a still further embodiment, a combination of a stitching matrix and a skin layer may be utilized. Bonding such as ultrasonic welding may also secure the ends together. With any configuration, the skin layer spans the seam line and/or stitching to provide a secure connection of the first portion 150 to the second portion.

Figure 2:
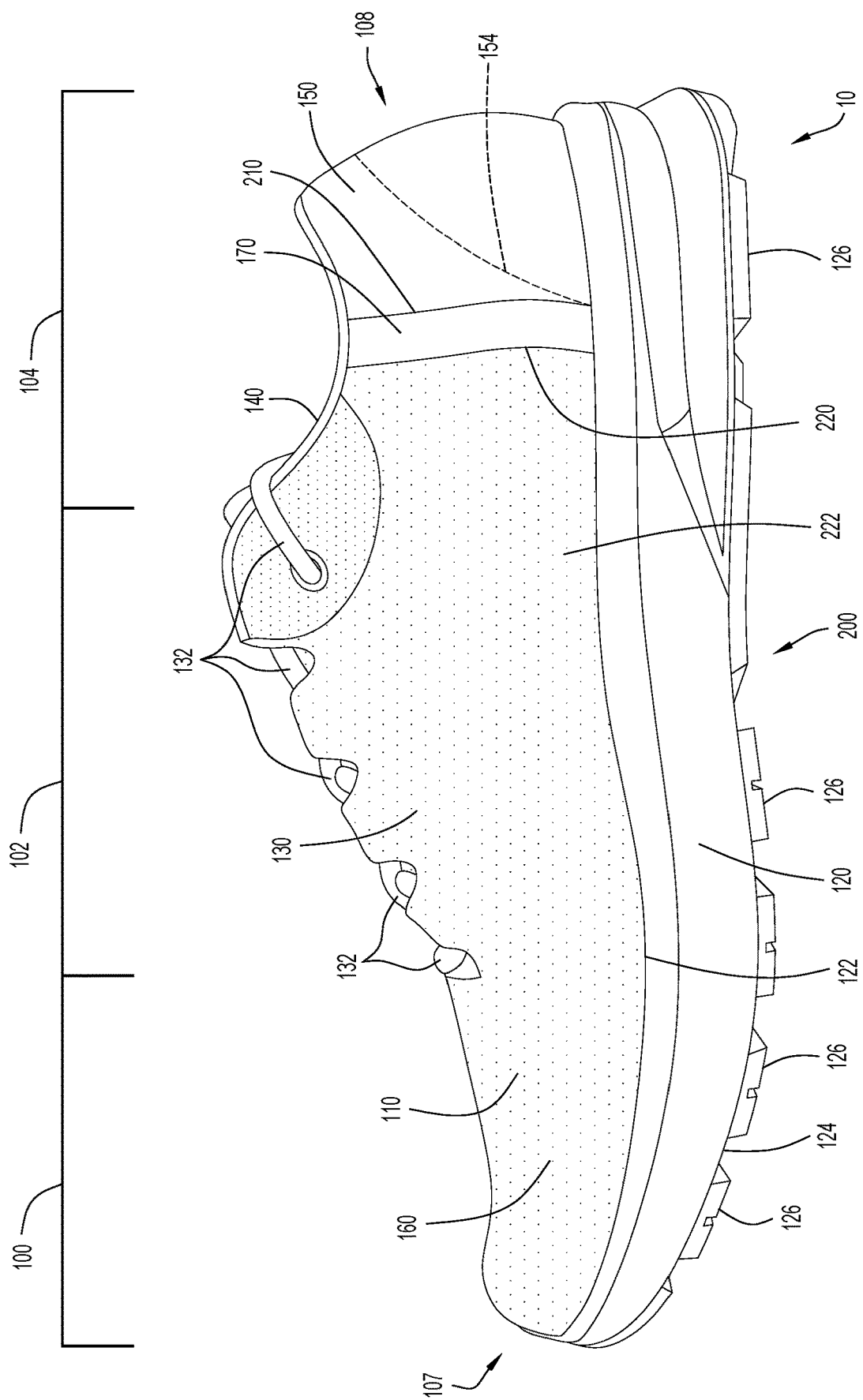
FIG. 2 is side view in elevation of the lateral side of the embodiment of the article of footwear shown in FIG. 1.
Figure 3:
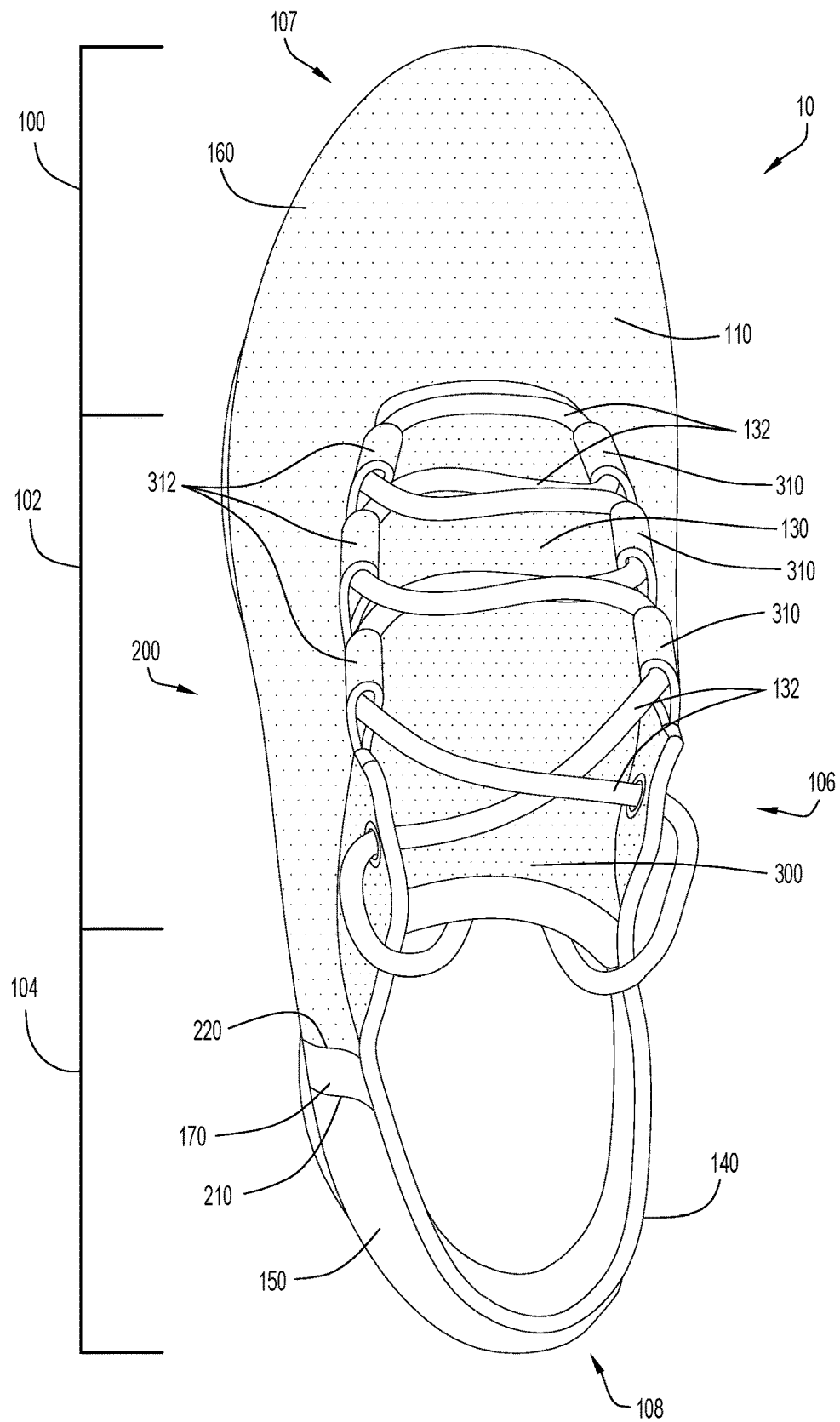
FIG. 3 is top view in plan of the article of footwear shown in FIG. 1.

Turning to FIGS. 1-3, the bridge structure or coupling member 170 couples the first 150 and second 160 portions of the upper 110 together at the abutting ends 152, 162, 210, 220, spanning (covering) the abutting ends 152, 162, 210, 220. While the bridge structure 170 (e.g., the skin layer) is shown in the figures as being disposed on an external side of the upper 110, a similar coupling member can also be provided internally within the upper 110 (in the foot cavity) at the abutting ends 152, 162, 210, 220 of the portions 150, 160. The bridge structure 170 can be effectively secured to these portions 150, 160 of the upper 110 by applying heat to seal the seam. With this configuration, the bridge structure 170 provides a seamless connection that minimizes and/or eliminates the friction caused by conventional (exposed) seams. That is, a seamless connection is provided because the bridge structure 170 creates a generally uninterrupted and/or continuous textile surface along the interior surface and/or exterior surface of the upper 110. In addition, the bridge structure reinforces the areas surrounding joint.

Figure 4:
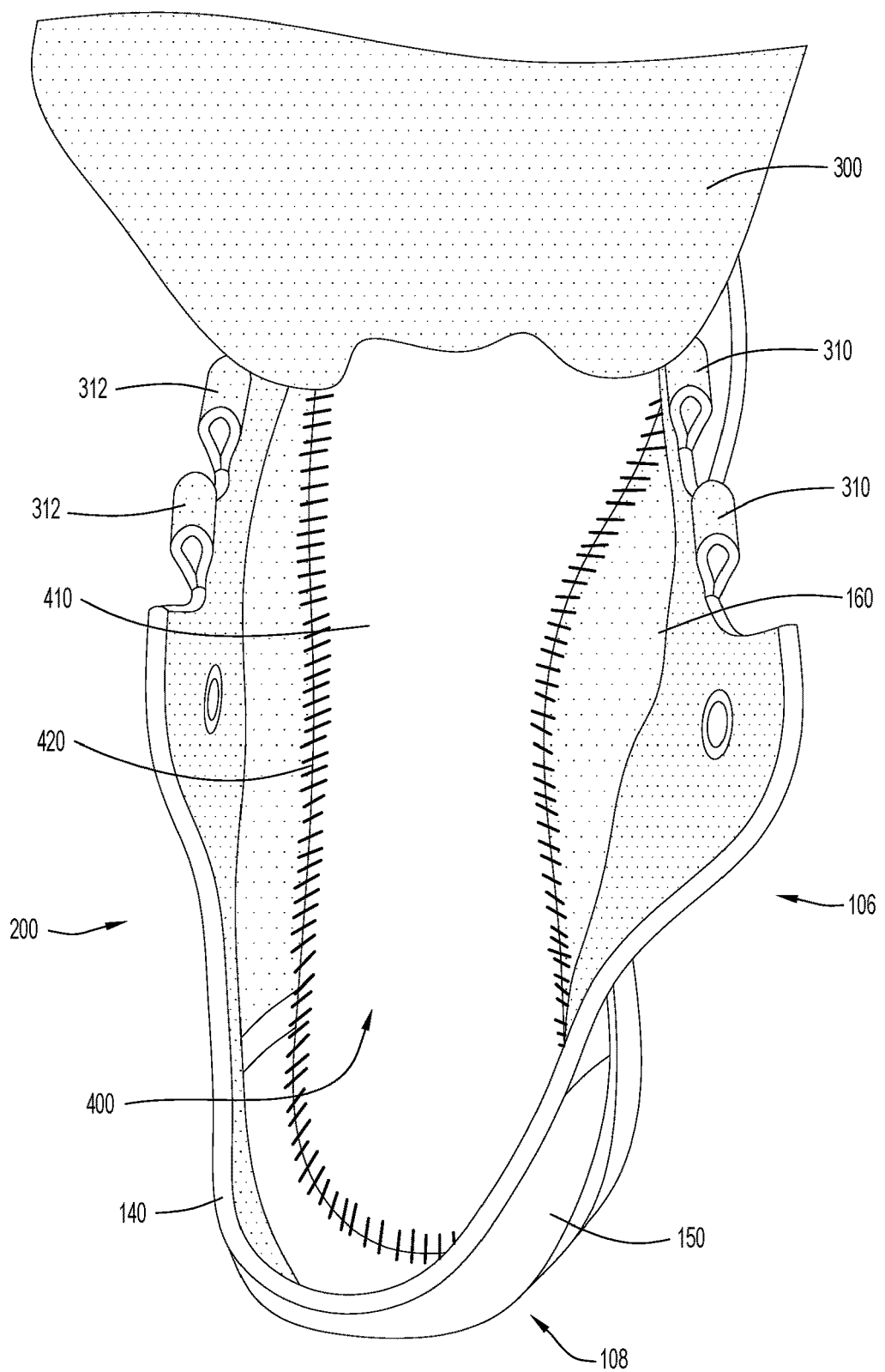
FIG. 4 is a top view in plan of the interior of the article of footwear shown in FIG. 1.
Figure 5:
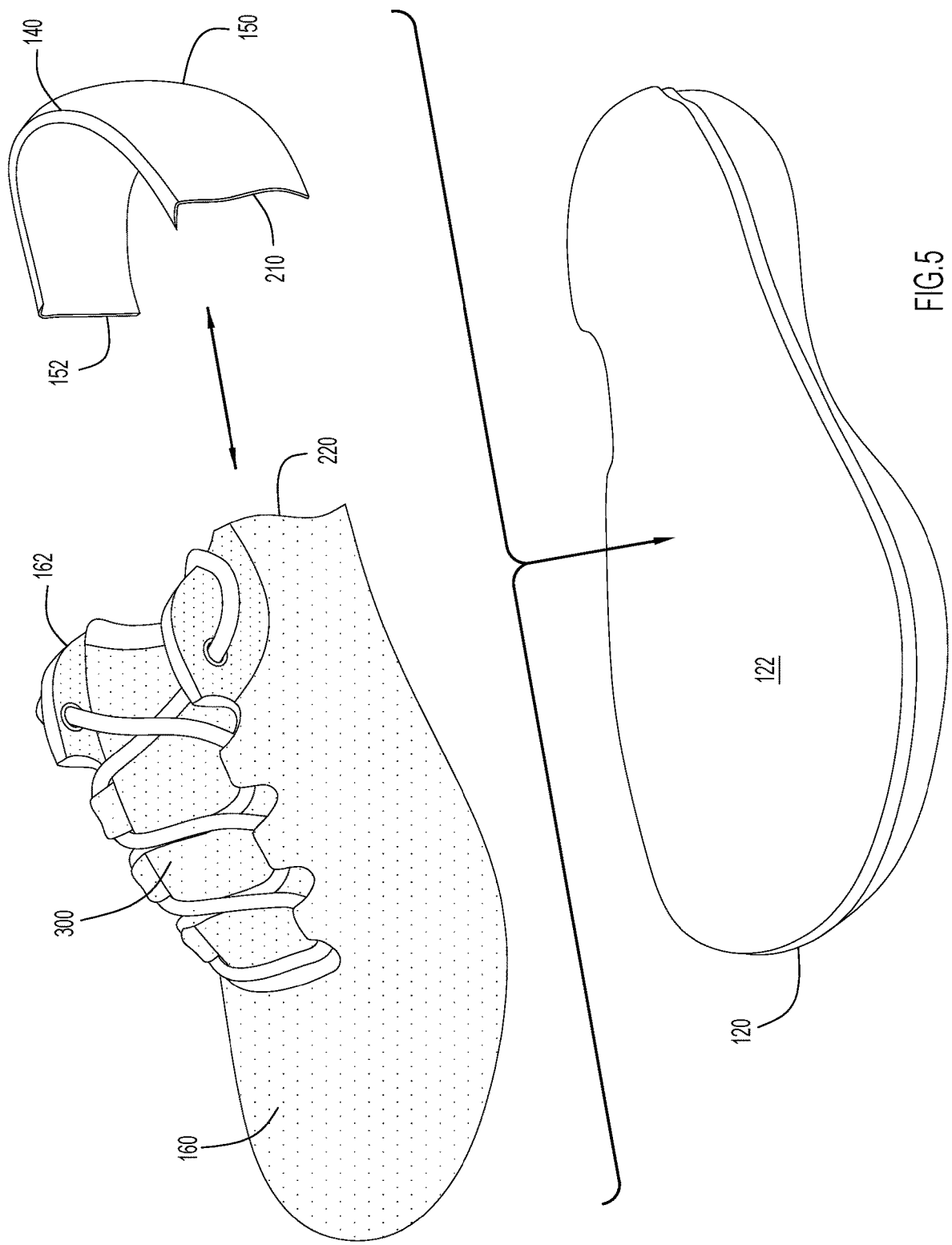
FIG. 5 is a schematic diagram of the various portions of the embodiment of the article of footwear shown in FIG. 1 being coupled to one another.

As illustrated in FIG. 5, the upper 110 is first formed by combining the first portion 150 with the second portion 160, as previously described, before securing the upper 110 to the top surface 122 of the sole structure 120. As previously explained, the upper 110 can be coupled to the sole structure 120 in any suitable manner (e.g., via a strobel or via direct connection between a lower portion of the upper and an upper portion of the sole structure), where such coupling can be achieved in any conventional and/or other suitable manner (e.g., via any form of adhesion or bonding, via stitching, via one or more types of fasteners, etc.). As best illustrated in FIG. 4, the first 150 and second 160 portions of the upper 110 are coupled to a strobel 410 via strobel stitching 420. The strobel stitching 420 couples the bottom edges of the first and second portions 150, 160 to the edges of the strobel 410. The strobel 410 may be coupled to the top surface 122 of the sole structure 120 via any conventional and/or other suitable manner (e.g., via any form of adhesion, bonding, stitching, etc.).

Referring to FIGS. 1-5, the first and second portions 150, 160 are formed from different materials, and as described herein, are formed from different processes. By way of example, the first portion 150 is formed or constructed from materials that permit the first portion 150 to be harder and/or more rigid in relation to the second portion 160 so as to provide suitable support for the ankle and heel of the user at the rear footwear region 104 (i.e., retaining the heel of the foot in place within the shoe 10). By way of specific example, the first portion may be a compression molded (thermoformed) textile laminate, while the second portion 160 may be a flat or circular knit structure.

In the compression molding process, individual layers are fused together to form a composite structure. Specifically, a textile laminate is shaped under heat and pressure to form an upper component having a predetermined macrostructure (shape) and/or microstructure (texture, surface features, etc.). The textile laminate includes a first (e.g., inner) textile or fabric layer, a second (e.g., outer) textile or fabric layer, and a foam layer disposed between the textile layers. As heat is applied, the foam softens, infiltrates the structure of the fabric layers to form a bond. Once cooled, the foam hardens into the desired shape, securing the layers together. The remaining structure is self-supporting, becoming stiff yet pliable. To increase the rigidity of the structure, additional layers are added between the inner and outer layers (discussed in greater detail below).

The textile layers includes natural and synthetic fabrics such as fabrics formed from polyesters (e.g., polyethylene terephthalate), polyolefins (e.g., polyethylene and polypropylene), polyamides (e.g., aliphatic or aromatic polyamide materials, such as nylon), elastomers, and any suitable combinations. The textile layer can further be formed of synthetic or natural leather or may even further comprise a plurality of layers (e.g., a plurality of layers comprising waterproof and breathable properties, such as fabric layers commercially available under the name GORE-TEX®). The textile layers can include elastomers that provide any suitable degree of stretch (e.g., two way stretch or four way stretch) at any one or more locations of the upper. For example, the fabric layers can include elastomeric materials such as a polyester-polyurethane copolymer. The textile may be woven, nonwoven, braided, embroidered, or knitted. The textile layers may possess a tight construction defining a generally continuous surface, or can be formed as a mesh defining apertures throughout the layer.

The foam layer provided in the fabric laminate can comprise any suitable one or more type(s) of open and/or closed cell foam materials that provide adequate cushioning and comfort for an intended purpose. Some examples of types of foam materials suitable for use in forming the first portion 150 of the upper 110 include, without limitation, polyolefins (e.g., polyethylene) foam materials, ethylene vinyl acetate (EVA) foam materials and polyurethane (PU) foam materials. The foam materials can have a thickness that is greater than the fabric materials. In example embodiments, the foam materials can have thicknesses in the range of about 1 mm to about 4 mm, e.g., about 2 mm to about 3 mm (e.g., about 2.5 mm to about 3.0 mm).

As noted above, additional layers may be provided to increase the rigidity of the laminate, increasing its stiffness. Accordingly, when the first portion is utilized to support the heel, an internal structural support operating a heel counter 154 may be provided within the fabric laminate. The structural support 154 may be formed of any suitable polymer to provide structural support for the first portion 150 of the upper 110 at the location(s) in which the internal structural support 154 is provided. In particular, the materials used to form the internal structural support 154 can be formed so as to have a hardness value (e.g., as measured on a Shore A hardness scale) that is greater than the hardness value of the materials used to form each of the foam and fabric layers of the fabric laminate, and the materials used to form the second portion 160 of the upper 110. Some examples of materials that can be used to form the internal structural support 154 include, without limitation, polyurethanes, polyolefins, polyamides (e.g., nylon), ethylene vinyl acetate (EVA), etc. In example embodiments, one or more internal structural support members 154 are formed from a thermoplastic polyurethane (TPU) material. During the formation of the fabric laminate, the internal structural support 154 can be formed from a flat sheet that is contoured during the compression molding process. Alternatively, the internal structural support 154 can be formed from starting materials comprising a powder composition that is fused and hardened into a single, unitary member or film either prior to or during the compression molding process. The internal structural support 154 can have a thickness in the range of about 0.5 mm to about 2.0 mm (e.g., a thickness of about 1.0 mm).

As noted herein, the fabric laminate that forms the first portion 150 of the upper 110 comprises a plurality of layers and can include any selected number of layers, where different fabric laminates including different types and/or numbers of layers can be provided at different locations of the first portion 150 of the upper. For example, some locations of the first portion 150 of the upper 110 may include the internal structural support 154 while other locations do not, thus changing the structural configuration of the fabric laminate at different locations of the first portion 150 of the upper 110. As previously noted, in the embodiments depicted in FIGS. 1-5, the article of footwear 10 includes an internal heel counter or internal structural support 154 located proximate to the heel end 108 of the article of footwear 10. As illustrated in the planar view of the first portion 150 of the upper 110 (FIG. 6A), the internal heel counter (i.e., the internal structural support) 154 is not disposed throughout the entire first portion 150. Thus, as illustrated, the first portion 150 of the upper 110 may include an upper segment 600, which does not contain the internal heel counter 154 (i.e., the internal structural support) as one of the laminate layers, and a lower segment 610, which does contain the internal heel counter 154 (i.e., the internal structural support) as one of the laminate layers. The internal heel counter 154 (i.e., the internal structural support) may span from the medial end 152 to the lateral end 210 along the bottom edge of the first portion 150. Thus, for the example embodiment of the first portion 150 of the upper 110, the upper segment 600 may be more flexible than the lower segment 610. It is noted that internal structural support members may be located at any other suitable locations of the first portion 150 or throughout the entire first portion 150 so as to add rigidity, hardness and/or support to the first portion 150 of the upper 110 at such locations.

The compression molding process used to form the fabric laminate of the first portion 150 of the upper 110 may include a method in which the molding material is first placed in an open, heated mold cavity. The mold is closed with a top force or plug member, pressure is applied to force the material into contact with all mold areas, while heat and pressure are maintained until the molding material has cured. The temperatures and pressures used in the compression molding process will depend upon the materials used to form the various layers within the fabric laminate, where softening of one or more layers is required to ensure suitable adhesion of the layers together during the compression molding process. In particular, softening of the one or more layers comprises being heated to a temperature that is lower than the melting point of the materials forming the layers (e.g., the softening temperature is at least about 20° C. lower than the melting point of the materials forming the layers). Example softening temperatures used during the compression molding process can be in the range from about 130° C. to about 200° C. (e.g., about 140° C. to about 190° C.).

Example fabric laminate layers used to form the first portion 150 of the upper 110 for the article of footwear 10 depicted in FIGS. 1-5 and 6A include a series of layers as follows (from internal or foot facing side to external side of the upper): fabric layer/foam layer/reinforcing fabric layer/foam layer/fabric layer. For fabric laminate layers that include an internal structural support layer, the internal structural support member can be provided as a layer disposed at any location within the fabric laminate such that at least one layer is located on each side of the internal structural support layer.

Figure 6A:
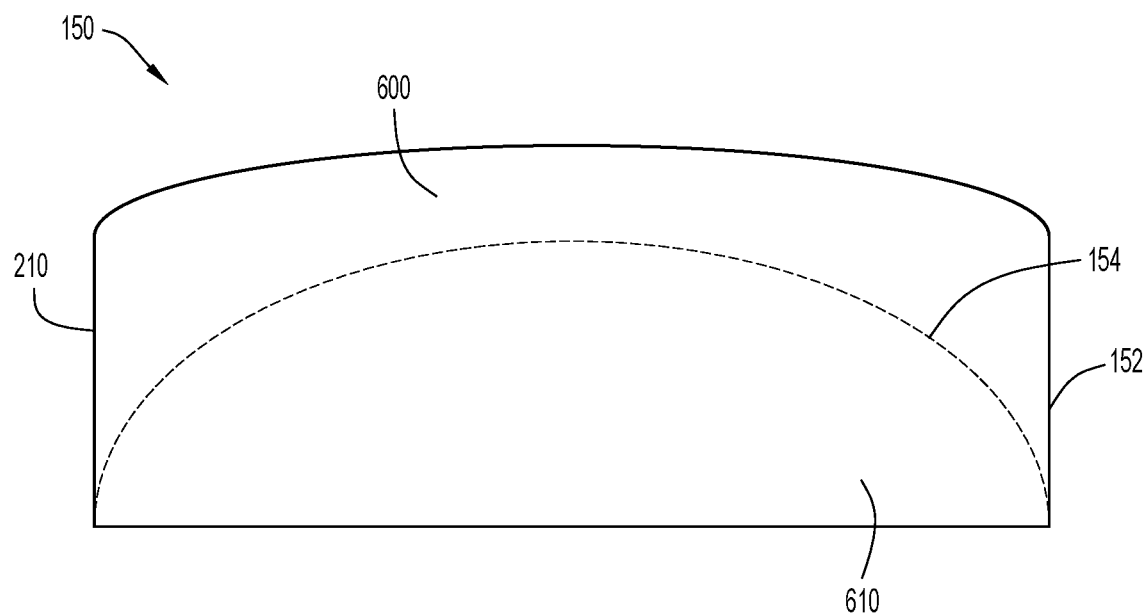
FIG. 6A is a planar view of the first portion of the upper of the article of footwear shown in FIG. 1.
Figure 6B:
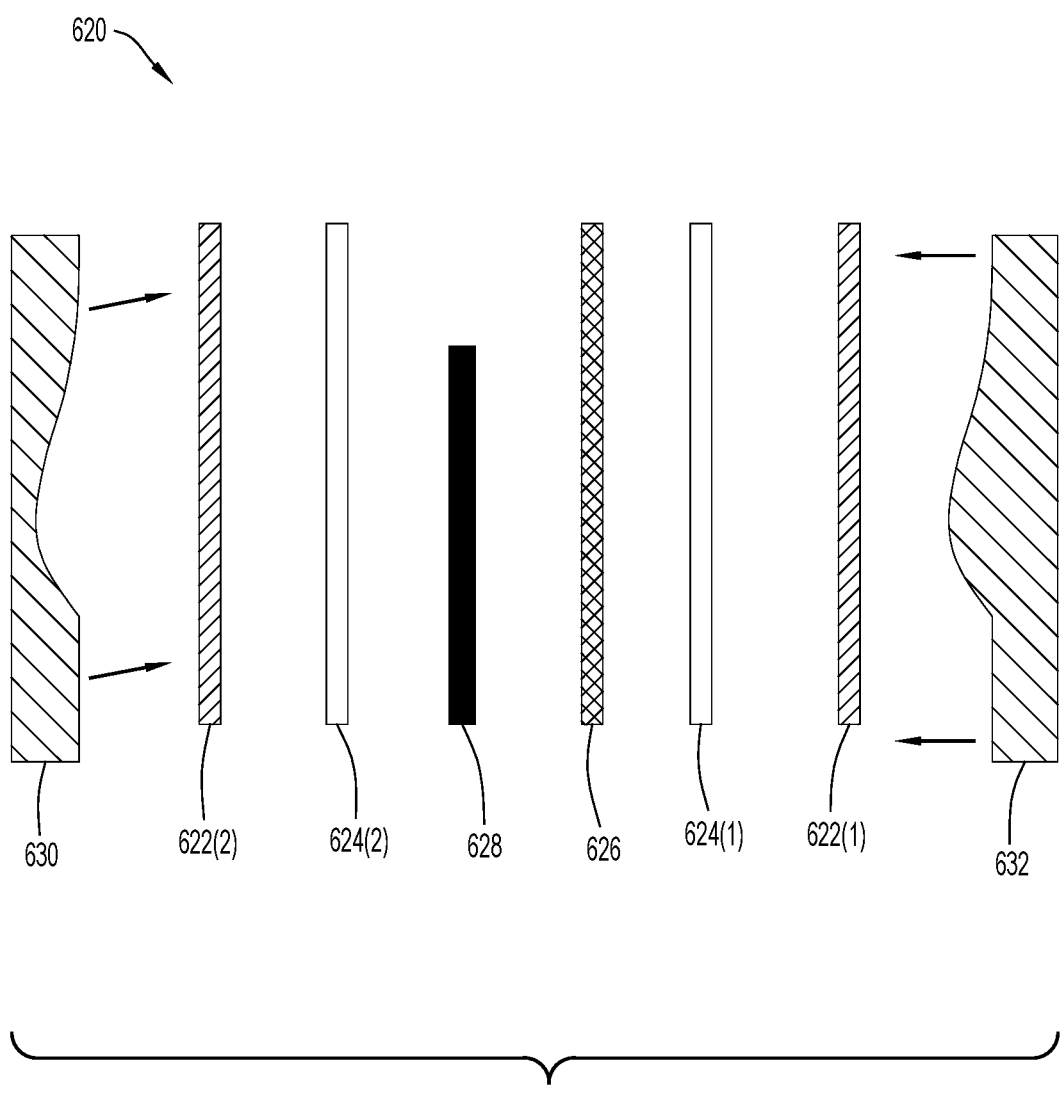
FIG. 6B is a cross-sectional view of compression molding apparatus showing upper formation and layers of a fabric laminate that form the first portion of the upper of the article of footwear shown in FIG. 1.

Referring to FIG. 6B, an example embodiment is depicted showing the formation of a fabric laminate used to form the first portion 150 of the upper 110. The fabric laminate 620 used to form the first portion 150 of the upper 110 includes a plurality of layers that are oriented or "stacked" in the following alignment (from interior or upper cavity/foot-facing side to exterior side of upper): (inner) fabric layer 622(1)/foam layer 624(1)/reinforcing fabric layer 626/internal structural support layer 628/foam layer 624(2)/(outer) fabric layer 622(2). The inner and outer fabric layers 622(1), 622(2) can be formed of the same or different materials. In addition, the foam material layers 624(1), 624(2) can also be formed of the same or different materials. The reinforcing fabric layer 626 can be formed of the same or different type(s) of materials as the inner and outer fabric layers 622(1), 622(2). In further example embodiments, the reinforcing fabric layer 626 can further include one or more additional foam layers (e.g., including a foam layer/fabric layer laminate defining layer 626, or a foam layer/fabric layer/foam layer laminate defining layer 626).

In an example embodiment, one or more of the fabric layers 622(1), 622(2), 626 can comprise polyester and/or an elastomer material (e.g., Spandex or elastane), the foam layers 624(1), 624(2) can comprise an open cell PU or EVA foam material, and the internal structural support layer 628 can comprise a TPU plastic material. In a further example embodiment, one or both the inner and outer fabric layers 622(1), 622(2) can comprise a fabric material including about 85% polyester and about 15% Spandex (weight 215 g/m$^2$), and the reinforcement fabric layer 626 can comprise a fabric including about 79% polyester and about 21% spandex (weight 210 g/m$^2$). The outer and inner fabric layers 622(1), 622(2) may possess similar or different properties, such as elongation properties. By way of example, the outer fabric layer 622(2) may possess greater elongation along its length than the inner fabric layer 622(1), while the inner fabric layer 622(1) may possess greater elongation along its width then the outer fabric layer 622(2). In still other embodiments, the outer and inner fabric layers 622(1), 622(2) may be formed of leather, GORE-TEX®, etc.

The compression mold equipment or apparatus used to secure the plurality of layers together to form the fabric laminate 620 includes a pair of molding portions 630, 632. In particular, the mold portions include a first or female molding portion 630 that includes a generally curved, concave surface and a second or male molding portion 632 that includes a generally curved, convex surface that is complementary to the concave surface of the female molding portion 630 so that the male molding portion 632 is configured to be received by and engage with the female molding portion 630. The compression mold apparatus is configured to shape the layers 622(1), 622(2), 624(1), 624(2), 626, 628 as they are pressed together between the female and male molding portions 630, 632 during the compression molding process. The molding of the layers can be performed in a single compression mold operation (e.g., combining all layers in their proper orientation or "stacked" positions and then pressing together within the mold apparatus) or in a plurality of compression mold operations (e.g., press two or more layers together in the mold, followed by pressing further layers together, etc. until the final fabric laminate is formed). The final fabric laminate formed by the compression mold apparatus will have a contour that is suitable for the first portion 150 of the upper 110, which, as previously explained, forms the heel end 108 of the upper 110 of the article of footwear 10.

Figure 6C:
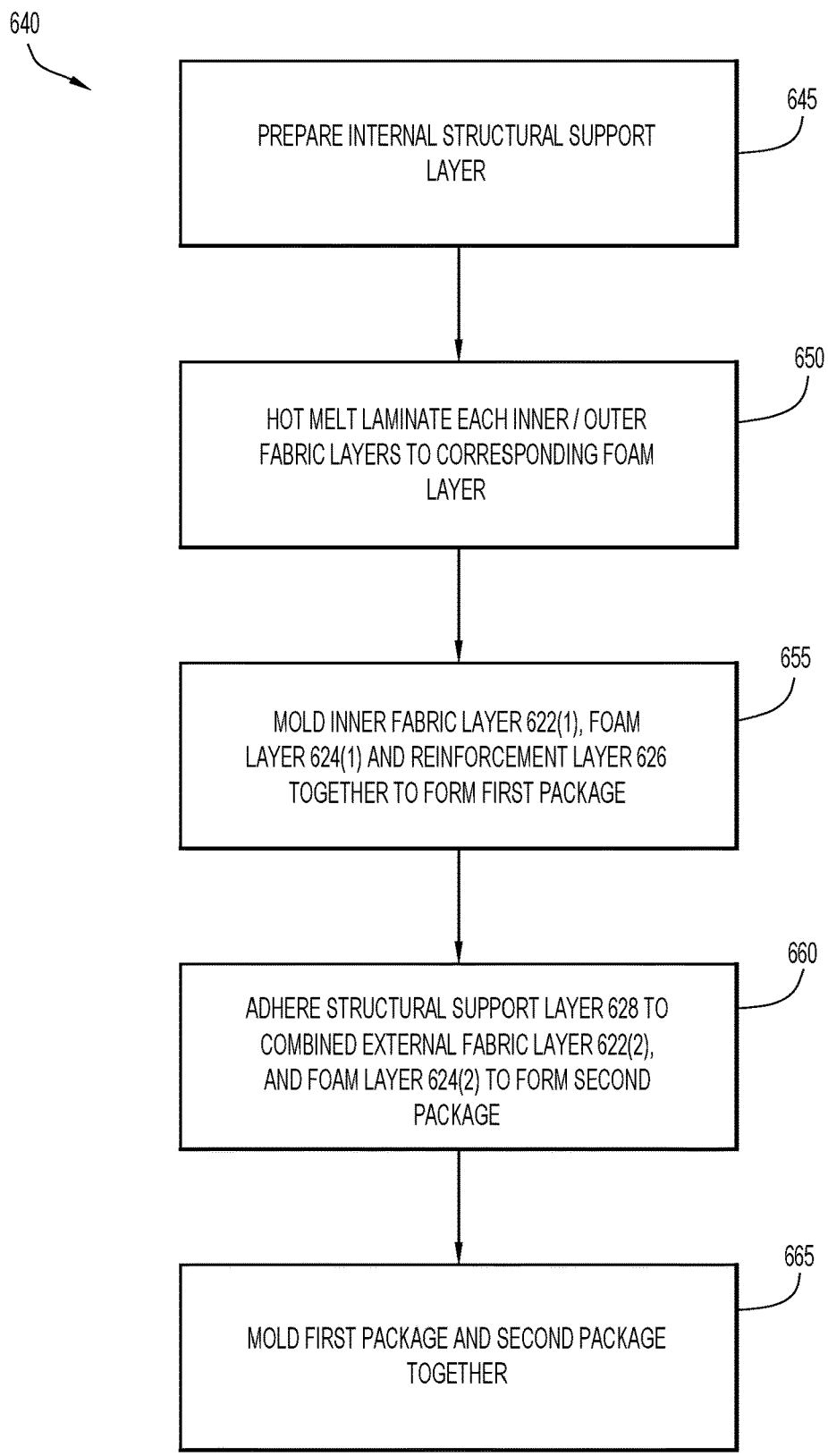
FIG. 6C is a flowchart illustrating an example process for compression molding the first portion of the upper of the article of footwear shown in FIG. 1 with multiple layers.

An example compression molding process 640 for forming a fabric laminate for the first portion 150 of the upper 110 (the heel cup of the upper 110), is described with reference to FIGS. 6A, 6B and the flowchart of FIG. 6C. The materials used to form the layers are initially prepared. In particular, at 645, the material used to form the internal structural support layer 628 is prepared by either die cutting a portion of a flat blank of the TPU plastic material or forming a solid TPU portion from a powder composition (heating/fusing the powder composition to form a unitary solid member that is generally flat). The internal structural support layer 628 can have a thickness of about 1 mm. At 650, each inner and outer fabric layer 622(1), 622(2) is secured, via hot melt lamination, to the corresponding foam layers 624(1), 624(2).

The other materials used to form the various layers can also be prepared, as necessary (e.g., by cutting each material from a blank to the appropriate size/dimensions for the mold apparatus). Each material portion forming the layer can be initially configured as a generally flat sheet of material. For example, in an embodiment in which the reinforcement fabric layer 626 includes both a fabric layer at least one additional foam layer (e.g., foam/fabric laminate, or foam/fabric/foam laminate), the reinforcement layer 626 can be prepared accordingly. For example, the reinforcement layer 626 can include a foam/fabric/foam laminate in which each foam layer is about 3 mm. The mold portions 630, 632 can further be heated to suitable temperatures for the mold process.

At 655, the inner fabric layer 622(1), foam layer 624(1) and reinforcement fabric layer 626 can be compression molded together to form a first package of combined layers in the following manner. The combined (via hot melt lamination) inner fabric layer 622(1) and foam layer 624(1) are placed against mold portion 632 (with the fabric layer 622(1) adjacent the mold portion 632). The reinforcement layer 626 can have an adhesive sprayed on one or both of its sides and adhered against the foam layer 624(1). The mold portions 630 and 632 can be pressed together at a sufficient temperature (e.g., a temperature of the mold portions of about 190° C., imparting a sufficient heat to the layers such that the layers are at a temperature of about 150° C.) and for a sufficient time period (e.g., about 160 seconds). The first package of molded components can then be cooled for about 2 minutes and/or until reaching ambient temperature (about 24° C. to about 28° C.) and removed from the mold portions.

At 660, the internal structural support layer 628 is adhered to the combined outer or external fabric layer 622(2)/foam layer 624(2) to form a second package of combined layers in the following manner. The combined (via hot melt lamination) external fabric layer 622(2) and foam layer 624(2) are placed against mold portion 630 (with the fabric layer 622(2) adjacent the mold portion 630). The internal structural support layer 628 is heated for a suitable time (e.g., about 10 seconds) and at a sufficient temperature (e.g., about 150° C.) to soften the layer 628, and it is then pressed against the foam layer 624(2) of the combined external fabric layer 622(1)/foam layer 624(2), resulting in layer 628 adhering to outer foam layer 624(2). The internal structural support layer 628 is suitably aligned with the foam layer 624(2) before it is pressed against it so as to ensure that the internal structural support layer 628 is aligned in the proper orientation and location of the fabric laminate 620 to be formed. In an example embodiment, the foam layer 624(2) can be provided with any suitable alignment indicators (indicia, one or more indentations, etc.) to facilitate appropriate alignment of the internal structural support layer 628 against the foam layer 624(2).

At 665, the first package of the combined inner fabric layer 622(1)/foam layer 624(1)/reinforcement layer 626 is placed in mold portion 632 (with fabric layer 622(1) adjacent mold portion 632), while the second package of the combined outer fabric layer 622(2)/foam layer 624(2)/internal structural support layer 628 is placed in mold portion 630 (with fabric layer 622(2) adjacent mold portion 630). The mold portions 630, 632 are pressed together to compression mold all of the various layers together forming the fabric laminate 620. In an example embodiment, the compression molding process to secure all layers together (step 665) can be carried out at a temperature of the mold portions of about 190° C., imparting a sufficient heat to the layers such that the layers are at a temperature of about 150° C., and at a time of about 160 seconds. The molded fabric laminate 620 can then be cooled for about 2 minutes and/or until reaching ambient temperature (about 24° C. to about 28° C.) and removed from the mold portions 630, 632. Optionally, an additional mold piece can be used that is contoured similar to the contours of the mold portions 630, 632 and to which the fabric laminate 620 is held against for a suitable time period to ensure the fabric laminate 620 maintains its molded shape during cooling.

Thus, the compression molding process forms a seamless, contoured portion for the first portion 150 of the upper 110 that is shaped in the form of the mold portions 630, 632 and that holds and maintains its shape. The internal structural support layer 628 (defining the internal heel counter) defines an internal reinforcing element for the first portion 150 of the upper 110 that possesses rigidity that is equal to or greater than that of both the inner and outer fabric layers 622(1), 622(2) as well as most or all of the other layers (e.g., foam layers 624(1), 624(2) and reinforcing fabric layer 626) within the fabric laminate 620.

The compression molding process can further include mold portions having patterned depressions and/or protrusions that, when forming the fabric laminate, define a corresponding "mirror image" pattern of depressions and/or protrusions along a surface of the fabric laminate that defines an exterior surface portion of the upper. This facilitates the formation of macrostructure and/or microstructures on inner and/or outer surfaces of the upper (i.e., an uneven contour of indentations and/or raised ridges having generally concave depressions, such as polygonal or diamond shaped depressions). The macrostructures and/or microstructures can further be formed on the outer surface of the outer fabric layer 622(2) or, alternatively, on another layer formed over the outer fabric layer 622(2).

Compression molding permits formation of a first upper portion 150 possessing different mechanical properties than the second upper portion 160. For example, upon heating, the first portion may become generally rigid, providing support for and/or restricting the movement of the foot within the fabric laminate areas of the upper. Compression molding further permits forming upper components possessing a unibody (one piece) construction that is seamless and stitchless (e.g., does not include individual components secured together via stitching). By way of example, the first portion 150 may be molded to have a seamless, stitchless heel cup. The heel cup is a self-supporting structure configured to surround the lateral side, medial side of the foot, terminating in in the forward lateral edge and a forward medial edge. The wall, moreover, may extend under the foot, curving to form an arcuate pocket operable to cradle the heel.

The second portion 160 of the upper 110 may be formed via knitting. Knitting is a process for constructing fabric by interlooping one or more strands. In general, knitting includes warp knitting and weft knitting. In warp knitting, the strands generally run lengthwise in the fabric (e.g., tricot, milanese, and raschel knitting). In weft knitting, one continuous strand runs crosswise in the fabric making all of the loops in one course. Weft knitting includes both circular knitting and flat knitting. In circular knitting, the fabric is produced on the knitting machine in the form of a tube, with the strands running continuously around the fabric. In flat knitting, the fabric is produced on the knitting machine in flat form, the strands alternating back and forth across the fabric. The knit structure may be a single layer (e.g., a single jersey), or may be formed as a two layer structure (e.g., a double jersey), wherein a first or interior layer and a second or exterior layer are formed of the same or varying strands and/or stitches. The interior and exterior layers are formed concurrently so that the layers are distinct, yet integrated one with the other (i.e., the loops of each layer are interlocked with one another). In an embodiment, the knit construction is a double knit structure. Specifically, the resulting textile includes a first layer and a second layer, each layer being formed of the same or varying strands and/or stitches. The layers, though distinct, are knit integrally with one another. Each layer includes a technical face and a technical back, with the loops back being interlocked along the technical back. By way of example, the knit structure may be a rib, double jersey, and/or an interlock fabric. In a specific embodiment, the textile is a double knit fabric formed via a flat or circular knitting.

The textile may comprise any suitable number (e.g., one or more) and/or types of strands. The term strand includes a single fiber, filament, or monofilament, as well as an ordered assemblage of textile fibers having a high ratio of length to diameter and normally used as a unit (e.g., slivers, roving, single yarns, plies yarns, cords, braids, ropes, etc.). In an example embodiment a strand is a yarn (a continuous strand of textile fibers, filaments, or material in a form suitable for knitting, weaving, or otherwise intertwining to form a textile fabric). A yarn may include a number of fibers twisted together (spun yarn); a number of filaments laid together without twist (a zero-twist yarn); a number of filaments laid together with a degree of twist; and a single filament with or without twist (a monofilament).

The strands forming the knitted textile (and thus the second portion 160 of the upper 110) may be any natural or synthetic strands suitable for their described purpose (i.e., to form a knit garment). The term "strand" includes one or more filaments organized into a fiber and/or an ordered assemblage of textile fibers having a high ratio of length to diameter and normally used as a unit (e.g., slivers, roving, single yarns, plies yarns, cords, braids, ropes, etc.). In a preferred embodiment, a strand is a yarn, i.e., a continuous strand of textile fibers, filaments, or material in a form suitable for knitting, weaving, or otherwise intertwining to form a textile fabric. A yarn may include a number of fibers twisted together (spun yarn); a number of filaments laid together without twist (a zero-twist yarn); a number of filaments laid together with a degree of twist; and a single filament with or without twist (a monofilament).

The strands may be heat sensitive strands such as flowable (fusible) strands and softening strands. Flowable strands are include polymers that possess a melting and/or glass transition point at which the solid polymer liquefies, generating viscous flow (i.e., becomes molten). In an embodiment, the melting and/or glass transition point of the flowable polymer may be approximately 80° ° C. to about 150° C. (e.g., 85° C.). Examples of flowable strands include thermoplastic materials such as polyurethanes (i.e., thermoplastic polyurethane or TPU), ethylene vinyl acetates, polyamides (e.g., low melt nylons), and polyesters (e.g., low melt polyester). Preferred examples of melting strands include TPU and polyester. As a strand becomes flowable, it surrounds adjacent strands. Upon cooling, the strands form a rigid interconnected structure that strengthens the textile and/or limits the movement of adjacent strands.

Softening strands are polymeric strands that possess a softening point (the temperature at which a material softens beyond some arbitrary softness). Many thermoplastic polymers do not have a defined point that marks the transition from solid to fluid. Instead, they become softer as temperature increases. The softening point is measured via the Vicat method (ISO 306 and ASTM D 1525), or via heat deflection test (HDT) (ISO 75 and ASTM D 648). In an embodiment, the softening point of the strand is from approximately 60° C. to approximately 90° C. When softened, the strands become tacky, adhering to adjacent stands. Once cooled, movement of the textile strands is restricted (i.e., the textile at that location stiffens).

One additional type of heat sensitive strand which may be utilized is a thermosetting strand. Thermosetting strands are generally flexible under ambient conditions, but become irreversibly inflexible upon heating.

The strands may also include heat insensitive strands. Heat insensitive strands are not sensitive to the processing temperatures experienced by the garment (e.g., during formation and/or use). Accordingly, heat insensitive strands possess a softening, glass transition, or melting point value greater than that of any softening or melting strands present in the textile structure and/or greater than the temperature ranges specified above.

The textile forming the second portion 160 of the upper 110 may further include a strand formed of non-elastomeric material, i.e., an inelastic strand. In conventional garments, elastic strands are utilized to provide a textile garment with stretch and recovery properties. An elastic strand is formed of elastomeric material (e.g., rubber or a synthetic polymer having properties of rubber). Accordingly, an elastic strand possesses the ability to stretch and recover by virtue of its composition. A specific example of an elastomeric material suitable for forming an elastic strand is an elastomeric polyester-polyurethane copolymer such as elastane, which is a manufactured fiber in which the fiber-forming substance is a long chain synthetic polymer composed of at least 85% of segmented polyurethane.

The degree to which fibers, yarn, or cord returns to its original size and shape after deformation indicates how well a fabric/textile recovers. Even when utilized, the garment does not quickly recover to its original size and shape. Sagging will develop within the article of footwear over time, caused by the incomplete recovery within the structure. An elastic strand such as elastane, moreover, retains water, potentially creating wearer discomfort. In addition, elastane must be plaited onto an existing yarn or completed covered by another fiber, increasing the weight of the textile (i.e., it cannot be the sole component of a course within the knit structure).

In contrast, an inelastic strand is formed of a non-elastomeric material. Accordingly, by virtue of its composition, inelastic strands possess no inherent stretch and/or recovery properties. Hard yarns are examples of inelastic strands. Hard yarns include natural and/or synthetic spun staple yarns, natural and/or synthetic continuous filament yarns, and/or combinations thereof. By way of specific example, natural fibers include cellulosic fibers (e.g., cotton, bamboo) and protein fibers (e.g., wool, silk, and soybean). Synthetic fibers include polyester fibers (poly(ethylene terephthalate) fibers and poly(trimethylene terephthalate) fibers), polycaprolactam fibers, poly(hexamethylene adipamide) fibers, acrylic fibers, acetate fibers, rayon fibers, nylon fibers and combinations thereof.

The textile forming the second portion 160 may include an inelastic strand possessing a topology that enables it to provide mechanical stretch and recovery within the knit structure. In an embodiment, the inelastic strand is a hard yarn texturized to generate stretch within the yarn. In a preferred embodiment, the inelastic strand is a bicomponent strand formed of two polymer components, each component possessing differing properties. The components may be organized in a sheath-core structure. Alternatively, the components—also called segments—may be oriented in a side-by-side (bilateral) relationship, being connected along the length of the strand. By way of example, a polyester bicomponent strand may be utilized.

The strands may further include high thermal conductivity strands and low thermal conductivity strands. In an embodiment, high conductivity strands are strands that transfer heat along its length (axis) and/or width (transverse dimension) at a higher rate than low thermal conductivity strands. In an embodiment, high thermal conductivity strands are strands formed (e.g., entirely formed) of material possessing a thermal conductivity value greater than 0.40 W/m K. By way of example, the strands may be formed of high density polyethylene (HDPE, 0.45-0.52 @23C) and/or ultra-high molecular weight polyethylene (UWMW-PE, 0.42-0.51 W/m K @23C).

In an embodiment, high thermal conductivity strand is a strand that possessing an axial thermal conductivity of at least 5 W/m K (e.g., at least 10 W/m K or at least 20 W/m K). The high thermal conductivity strand may be a multi-filament fiber such as a gel-spun fiber. By way of specific example, the high conductivity strand is a gel-spun, multi-filament fiber produced from ultra-high molecular weight polyethylene (UHMW-PE), which possesses a thermal conductivity value in the axial direction of 20 W/m K (DYNEEMA, available from DSM Dyneema, Stanley, NC).

The low thermal conductivity strand, in contrast, transfers heat along its length (axis) and/or width (transverse dimension) at a lower rate than that of the high thermal conductivity strand. In an embodiment, the low thermal conductivity strand is formed (e.g., entirely formed) of material possessing a thermal conductivity of no more than 0.40 W/m K. By way of example, the low conductivity strand may be formed of low density polyethylene (LDPE, 0.33 W/m K @23 C), nylon (e.g., nylon 6; nylon 6,6; or nylon 12) (0.23-0.28 W/m K @23° C.), polyester (0.15-0.24 W/m K @23° C.), and/or polypropylene (0.1-0.22 W/m K @23 C).

In another embodiment, the low thermal conductivity strand possesses an axial thermal conductivity (as measured along its axis) that is less than the axial conductivity of the high conductivity strands. By way of example, the low thermal conductivity strands possess an axial thermal conductivity value of less than 5 W/m K when high thermal conductivity strand possesses a thermal conductivity of greater than 5 W/m K; of less than 10 W/m K when high conductivity strand possesses a thermal conductivity of at least 10 W/m K; and/or less than 20 W/m K when high conductivity strand possesses a thermal conductivity of greater than 20 W/m K. Exemplary low thermal conductivity strands include strands formed of polyester staple fibers (axial thermal conductivity: 1.18 W/m K); polyester filament strands (axial thermal conductivity: 1.26 W/m K); nylon fiber strands (axial thermal conductivity: 1.43 W/m K); polypropylene fiber strands (axial thermal conductivity: 1.24 W/m K); cotton strands (axial thermal conductivity: 2.88 W/m K); wool strands (axial thermal conductivity: 0.48 W/m K); silk strands (axial thermal conductivity: 1.49 W/m K); rayon strands (axial thermal conductivity: 1.41-1.89 W/m K); and aramid strands (axial thermal conductivity: 3.05-4.74 W/m K), as well as combinations thereof.

As noted above, the resulting textile from which the article of footwear is formed includes an inner and outer layer, each layer having an interior side (the technical back) and an exterior side (the technical face). Each layer may be formed of the same or varying strands and/or stitches. In an embodiment, knitted textile is manufactured using different yarns to form each layer. By using distinct yarns in the layers, knitted textile can have different knitting patterns, knitted structures, yarn types, and/or yarn colors. By way of specific example the technical face of the outer layer may be formed of an abrasion resistant strand (e.g., polyester or nylon) and/or a strand possessing low thermal conductivity while the inner (user facing) layer is formed of strands possessing high thermal conductivity.

With this configuration, a microclimate modulation structure may be integrated into the knit structure. The temperature modulation structure is operable to affect movement of heat, air, and/or moisture (e.g., vapor) within the foot cavity. Thermal comfort is an important factor considered in footwear design. The microclimate of footwear, which contributes to thermal comfort, is influenced by heat and moisture within the foot cavity. Accordingly, moving heat and/or moisture away from the surface of the foot and/or exhausting heat from the foot cavity optimizes the microclimate which, in turn, optimizes the thermal comfort experienced by the user. In an embodiment, the microclimate modulation structure is located in the forefoot area, e.g., the vamp of the upper.

The various types of strands that can be used to form a textile structure can be incorporated within the textile structure so as to vary certain properties of the textile structure at different locations of the textile structure, which in turn will result in the uppers formed from the textile structure having such properties. For example, the textile structure can be formed so as to have a varying degree of elasticity in both the machine direction or lengthwise dimension or direction of the textile structure as well as the cross direction or width direction of the textile structure. As described in further detail herein, textile structures can be formed in which the degree of stretch or degree of elasticity of the textile structure in its length direction differs (e.g., is greater or less than) from the degree of stretch or degree of elasticity of the textile structure in its width direction.

The second portion 160 may possess a unitary structure (also called a unibody or one piece construction) to minimize the number of seams utilized to form the shape of the upper. That is, the second portion 160 may be formed as a one-piece template, each template section being integral with adjacent template portions. Stated yet another way, each section of the second portion 160 may include a common strand interconnecting that section with adjacent sections (i.e., the common strand spans both sections). In addition, the connection between adjacent sections may be stitchless and seamless. By stitchless and/or seamless, it is meant that adjacent sections are continuous or integral with each other, including no edges that require joining by stitches, tape, adhesive, welding (fusing), etc.

Referring to FIG. 7B, a textile structure comprises a length of fabric 720 including a series of structures 730(1)-730(10), 732(1)-732(10) defined along a surface of the fabric 720, where the structures 730(1)-730(10), 732(1)-732(10) are defined within boundary lines along the fabric 720 and are arranged in a selected pattern along the fabric surface. In particular, the structures 730(1)-730(10), 732(1)-732(10), when removed from the fabric 720 by separating each structure along the boundary lines defining the structure 730(1)-730(10), 732(1)-732(10), are used to form the second portion 160 of the upper 110 of the article of footwear 10. The pattern along fabric 720 as depicted in FIG. 7B shows a second portion 160 of the upper 110 structure pattern including a plurality of left footed upper structures 730(1)-730(10) arranged in rows 740(1), 740(2) along a lengthwise direction L1 (machine direction in which the fabric is formed) of the fabric 720 and also a plurality of right footed upper structures 732(1)-732(10) also arranged in rows 742(1), 742(2) along the lengthwise direction L1 of the fabric 720. Each left footed upper structure 730(1)-730(10), when removed from the fabric 720, forms the second portion 160 of the upper 10 of a left footed article footwear 10, while each right footed upper structure 732(1)-732(10), when removed from the fabric 720, forms the second portion 160 of the upper 110 of a right footed article of footwear 10.

The boundary line pattern of each upper structure 730(1)-730(10), 732(1)-732(10) illustrated in FIG. 7B can be defined along the surface of the fabric 720 in any suitable form as printed boundary line portions, markings, suitable alignment with a die cutting machine, etc. that facilitate removal of the upper structures 730(1)-730(10), 732(1)-732(10) within the boundary line pattern via any suitable automated or other process. For example, in rapid or speed forming of upper structures 730(1)-730(10), 732(1)-732(10) from a fabric structure 720, the upper structures 730(1)-730(10), 732(1)-732(10) can be removed from the fabric structure 720 via an automated laser cutting process (e.g., based upon the markings along the fabric surface), a machine/die cutting process (e.g., where a die cutting machine removes the upper structures based upon an alignment of the die cutting components with the fabric), etc. Thus, the footwear upper boundary lines defined along the surface of the fabric 720 simply represents the portion of each upper structure 730(1)-730(10), 732(1)-732(10) to be cut, separated or removed in any suitable manner from the fabric 720 and (depending upon the process used to separate the upper structures from the fabric) such boundary lines may or may not represent actual printed lines or markings on the fabric surface.

As previously explained, and as illustrated in the planar view of the second portion 160 of the upper 110 (FIG. 7A), the second portion 160 of the upper 110 includes an end 162 disposed on the medial side 106 and an end 220 disposed on the lateral side 200. The second portion 160 of the upper 110 extends from the forward footwear region 100, through the intermediate footwear region 102, and at least partially into the rear footwear region 104. The second portion 160 defines the toe cage 107 as well as most of or the entire instep 130 of the upper 110. The second portion 160 further includes a medial wing 164 and a lateral wing 222 that extend rearward from the toe cage 107 toward the medial and lateral ends 162, 220, respectively. The medial wing 164 and the lateral wing 222 define the medial and lateral sides 106, 200, respectively, of the second portion 160 of the upper 110.

As further illustrated in FIG. 7A, an opening/recess 700 is disposed in the instep 130 area of the second portion 160 of the upper 110. The opening/recess 700 is configured to receive the tongue 300 of the upper 110, such that the tongue 300 couples to the forward most edge 710 that is disposed along the toe cage 107 of the second portion 160 of the upper 110. In other embodiments, where the second portion 160 of the upper 110 forms part of a tongue-less upper construction, the second portion 160 of the upper 110 does not include the opening/recess 700. In yet other embodiments of the second portion 160 of the upper 110, the tongue 300 may be integrally formed with the second portion 160 of the upper 110, where the tongue 300 would be formed in the area of the second portion 160 of the upper 110 occupied by the opening/recess 700 (with medial and lateral slits running along the instep 130 of the second portion 160 of the upper 110).

The upper structures 730(1)-730(10), 732(1)-732(10) formed in accordance with the present invention are configured so as to form the second portion 160 of the upper 110 of the article of footwear 10, where the first portion 150 of the upper 110, as explained previously, is formed as a thermoformed structure. As illustrated in FIG. 5, the thermoformed first portion 150 of the upper 110 is combined with one of the upper structures 730(1)-730(10), 732(1)-732(10) that form the second portion 160 of the upper 110 to complete the upper 110 formation.

As illustrated in FIGS. 7B and 7C, the upper structures 730(1)-730(10), 732(1)-732(10) can be aligned in the manner as shown so as to utilize as much of the fabric 720 as possible while minimizing unused fabric material/fabric waste. Fabric waste constitutes portions of the fabric 720 that are left and unused when the upper structures 730(1)-730(10), 732(1)-732(10) are removed from the fabric 720. Ideally, it is desirable to define a plurality of upper structures along the fabric surface so as to utilize as much of the fabric material as possible, thus avoiding or minimizing fabric waste. With the embodiments of the present invention, the alignment of upper structure boundary lines for removing upper structures from the fabric can be configured so as to utilize a significant portion of the fabric structure, where as much as 80% or greater, preferably 85% or greater, more preferably 90% or greater, and even more preferably 95% or greater, of the fabric material is utilized to form the textile upper structures. This results in a minimization of waste of fabric material (i.e., portions of the fabric 720 that are outside of the boundary lines defining upper structures 730(1)-730(10), 732(1)-732(10)) to be no greater than 20%, preferably no greater than 15%, more preferably no greater than 10%, and even more preferably no greater than 5%.

The alignment of right and left footed upper structures 730(1)-730(10), 732(1)-732(10) along the surface of the fabric 720 in FIG. 7B is configured such that rows 740(1), 740(2) of left footed upper structures 730(1)-730(10) extend in a lengthwise dimension or direction L1 of the fabric surface, while rows 742(1), 742(2) of right footed upper structures 732(1)-732(10) also extend along the fabric surface in the lengthwise dimension or direction L1. The four rows 740(1), 740(2), 742(1), 742(2) of right and left footed upper structures 730(1)-730(10), 732(1)-732(10) are separated from each other in the widthwise dimension or direction W1 (also the cross-direction or transverse machine direction) of the fabric structure 720. Each of the left and right footed upper structures 730(1)-730(10), 732(1)-732(10) are further aligned in their respective rows 740(1), 740(2), 742(1), 742(2) in the same orientation in relation to other upper structures 730(1)-730(10), 732(1)-732(10) in the same row 740(1), 740(2), 742(1), 742(2). In particular, as shown in FIG. 7B, each of the left footed upper structures 730(1)-730(10) are defined in an orientation such that their first (toe) ends 107 face in the same direction along the fabric structure 720, where the first ends 107 are facing toward a first edge 722 and away from an opposing second edge 724 of the fabric structure 720. Each of the right footed upper structures 732(1)-732(10) are also defined in an orientation such that their first (toe) ends 107 face in the same direction along the fabric structure (the first ends 107 face toward the fabric edge 724 and away from fabric edge 722). In other words, the left footed upper structures 730(1)-730(10) are oriented in the opposite direction as the right footed upper structures 732(1)-732(10).

In the embodiments of FIG. 7C, the rows 744(1)-744(4) contain both left and right footed upper structures 730(1)-730(10), 732(1)-732(10) oriented in an alternating pattern. As previously explained, the left footed upper structures 730(1)-730(10) are oriented such that their first (toe) ends 107 face in the same direction along the fabric structure 720, where the first ends 107 are facing toward a first edge 722 and away from an opposing second edge 724 of the fabric structure 720. Each of the right footed upper structures 732(1)-732(10) are also defined in an orientation such that their first (toe) ends 107 face in the same direction along the fabric structure (the first ends 107 face toward the fabric edge 724 and away from fabric edge 722). Each row alternates, along the lengthwise direction L1, between left footed upper structures 730(1)-730(10) and the right footed upper structures 732(1)-732(10). Depending upon the shape of the upper structures 730(1)-730(10), 732(1)-732(10), the configuration of FIG. 7C can allow the upper structures 730(1)-730(10), 732(1)-732(10) along rows 744(1)-744(4) to be closer or further nested toward each other (thus reducing the amount of unused or waste fabric material after removal of the upper structures).

FIGS. 7B and 7C illustrate only two of the many ways in which the upper structures 730(1)-730(10), 732(1)-732(10) may be oriented on a fabric structure 720 to facilitate rapid formation of multiple upper structures from the fabric structure while minimizing waste from the fabric structure.

As previously noted, the fabric structure can be formed in any suitable manner, including any suitable number and/or types of different strands used to form the fabric structure and that can impart different structural characteristics at different portions of the fabric structure. In an example embodiment, a fabric structure can be formed having different degrees of elongation or different degrees of stretch in different directions of the fabric structure and/or at different portions of the fabric structure. For example, a fabric structure used to form upper structures in a speed forming process can be formed such that its elongation/stretch percentage and/or its elastic recovery differ in its length dimension compared to its width dimension. The elongation percentage or degree of stretch can be measured, e.g., as an amount at which a fabric material can be stretched from its original or relaxed state to a final stretched state (e.g., when a specified force is applied). The elastic recovery can be measured, e.g., as an amount at which a fabric material can be stretched from its original or relaxed state when a specified force is applied and is further capable of returning to its original, relaxed state after the force is removed.

It is typically desirable for footwear uppers, such as textile footwear uppers, to be less stretchable in a lengthwise or heel-to-toe direction of the upper (and shoe) while being more stretchable in a width direction or between medial and lateral sides of the upper (and shoe). This allows for a nice, snug fit for the shoe between heel and toe for the wearer while allowing some level of stretch and comfort along the lateral and medial sides of the wearer's foot. The elongation/stretch properties of the fabric structure 720 can be adjusted or configured such that the orientation of the upper structures to be formed in the fabric structure 720 have elongation stretch properties that are desirable for certain uppers.

For the example embodiments depicted in each of FIGS. 7B and 7C, the fabric structure 720 can be constructed (e.g., by utilizing different types of strands at different locations during the formation of the fabric structure) such that the elongation properties (e.g., elongation percentage and/or elongation recovery) along the lengthwise dimension L1 of the fabric structure is greater than the elongation properties (e.g., elongation percentage and/or elongation recovery) of the fabric structure 720 along its width dimension W1. Since the right and left footed upper structures 730(1)-730(10), 732(1)-732(10) are all aligned with heel-to-toe orientations generally extending in the width dimension W1 of the fabric structure 720, providing elongation properties to the fabric structure that vary in this manner facilitates the rapid formation of upper structures having greater elongation properties in the width or medial-to-lateral side dimension of the uppers in comparison to the elongation properties in the length or heel-to-toe dimension of the uppers.

As previously noted herein, the textile or fabric structure can be formed utilizing any suitable knitting techniques. In an example embodiment illustrated in FIG. 7D, the fabric structure 720 may be initially formed as a knit structure utilizing a circular knit process. The circular knit process results in the formation of a tubular knit structure 750. The tubular knit structure 750 can be separated along cut line 752 to form the fabric structure 720 of FIGS. 7B and 7C, where edges 722, 724 are defined by the separation of the tubular knit structure 750 at the cut line 752.

An example forming process 760 for forming a plurality of textile uppers is now described with reference to the flowchart of FIG. 7E. In this example embodiment, a knit fabric structure is formed, and this structure is utilized to form knit uppers in a speed forming process. However, in other example embodiments, a textile structure can also be formed via any other process (weaving, nonwoven process, etc.) and utilizing the techniques in accordance with the present invention to speed form a plurality of upper structures for manufacturing footwear uppers for shoes. At 765, a knit fabric structure (e.g., a structure 720 as depicted in FIGS. 7B and 7C, or a structure 750 depicted in FIG. 7D) is formed via any suitable circular knit or flat knit process, where the strands used to form the knit structure are combined so as to achieve different elongation/stretch properties in the lengthwise dimension L1 vs. the width dimension W1 of the knit fabric structure 720. At 770, if the knit structure is a circular knit structure 750 (e.g., as depicted in FIG. 7D), the circular or tubular knit structure is separated along a cut line 752 and flattened to form a generally planar knit fabric structure 720.

At 775, pattern markers defining the upper structures 730(1)-730(10), 732(1)-732(10) (e.g., defining the boundary lines within which the upper structures 730(1)-730(10), 732(1)-732(10) are located, where the boundary lines locate where patterned portions of the knit fabric structure 720 are removed) are provided. Such markers can be printed or defined in any other suitable manner along a surface of the knit fabric structure. Alternatively, or in combination with printed markers, markers can simply be physical alignments between the knit fabric structure and a tool die cutting or similar type of machine that removes the upper structure patterns 730(1)-730(10), 732(1)-732(10) from the fabric structure 720. At 780, the upper structures 730(1)-730(10), 732(1)-732(10) are removed from the knit fabric structure 720 by separating such upper structures 730(1)-730(10), 732(1)-732(10) around their boundary lines, where the separation can be achieved via any suitable automated or other separation technique (e.g., laser cutting, mechanical die cutting, etc.).

At 785, the second portion 160 of the upper 110 of the article of footwear 10 is formed from one of the upper structures 730(1)-730(10), 732(1)-732(10) that have been removed from the knit fabric structure 720. As previously noted herein, the footwear upper structures 730(1)-730(10), 732(1)-732(10) that form the second portion 160 of the upper 110 are configured to be combined with the thermoformed first portion 150 of the upper 110 to form a complete upper 110 of the article of footwear 10. As previously explained, the complete upper 110 can then be combined with sole structures 120 (e.g., midsoles and/or outsoles) and/or other components, as illustrated in FIG. 5, to form the article of footwear 10.

Thus, the forming process facilitates rapid formation (e.g., in a manufacturing facility that produces shoes or portions of shoes) of footwear uppers or portions of footwear uppers while minimizing waste or non-used material in a textile structure due to the patterning and alignment of upper structures for removal from the textile structure. In addition, imparting certain characteristics, such as stretch or elongation properties, in different areas and/or along different directions of the textile structure combined with positioning or orientation of the boundary lines used to form the footwear upper structures ensures that the footwear uppers formed using the upper structures will have the desired characteristics for the shoes to be manufactured using the uppers.

Thus, the present invention facilitates the formation of an article of footwear that is lighter and more breathable than conventional footwear, while still remaining as durable as conventional footwear. Even though the article of footwear is lighter and more breathable than conventional footwear, the present invention is still capable of providing the proper amount of support for a foot disposed within the article of footwear. As previously explained, the present invention provides an upper for an article of footwear that can be manufactured rapidly with both a textile portion and a thermoformed portion. Thus, both the textile portion and the thermoformed portion may be quickly manufactured, reducing both the time and amount of labor required to produce the upper of the article of footwear. The textile portion of the upper enables the upper to be lightweight and breathable, while the thermoformed portion of the upper enables the upper to contain targeted structural support (i.e., an internal structural support member can be provided within and between two or more layers of the upper to enhance the structural support at different locations of the upper) without adding an unnecessary amount of weight to the article of footwear. As further described herein, the formation of the upper of the present invention article of footwear may not only be completed in a rapid manner, but may also reduce the amount of materials that are wasted in the formation process. Finally, the thermoformed portion and the textile portion may be coupled to one another without any exposed stitching, reducing any unwanted chaffing or rubbing of the upper of the article of footwear on the foot disposed within the article of footwear.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

Although the disclosed inventions are illustrated and described herein as embodied in one or more specific examples, it is nevertheless not intended to be limited to the details shown, since various modifications and structural changes may be made therein without departing from the scope of the inventions and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

What is claimed is:

1. A method for constructing an upper for an article of footwear, the method comprising:
   forming a knit structure having a first degree of elongation along a width dimension of the knit structure and a second degree of elongation along a length dimension of the knit structure, the first degree of elongation being greater than the second degree of elongation;
   removing a first upper structure from the knit structure, the first upper structure including a medial side, an opposite lateral side, a medial edge disposed on the medial side, and a lateral edge disposed on the lateral side, wherein the first degree of elongation extends along a direction spanning from the medial side to the lateral side;
   compression molding a second upper structure that includes a medial side, an opposite lateral side, a medial edge disposed on the medial side, and a lateral edge disposed on the lateral side;
   coupling the medial edge of the first upper structure to the medial edge of the second upper structure; and
   coupling the lateral edge of the first upper structure to the lateral edge of the second upper structure.

2. The method according to claim 1, wherein removing a first upper structure from the knit structure further comprises:

removing a plurality of first upper structures from the knit structure, each first upper structure including the medial side, the opposite lateral side, the medial edge disposed on the medial side, and the lateral edge disposed on the lateral side, each first upper structure being removed from the knit structure so that the first degree of elongation extends along the direction spanning from the medial side to the lateral side.

3. The method according to claim 1, wherein the knit structure is formed from a flat knit process.

4. The method according to claim 1, wherein the knit structure is initially formed as a tubular knit structure.

5. The method according to claim 4, further comprising, prior to removing the first upper structure:
cutting the tubular knit structure along a cut line; and
flattening the tubular knit structure to form a planar knit structure.

6. The method according to claim 1, wherein the first upper structure is a seamless unitary structure.

7. The method according to claim 1, wherein the compression molding the second upper structure comprises:
combining a plurality of first material layers within a mold;
forming, via the mold, a first package of combined layers with the plurality of first material layers;
combining a plurality of second material layers within the mold, the plurality of second material layers including an internal structural support layer;
forming, via the mold, a second package of combined layers with the plurality of second material layers including the internal structural support layer; and
compression molding, via the mold, the first package of combined layers with the second package of combined layers to form the second upper structure having a medial side, an opposite lateral side, a medial edge disposed on the medial side, and a lateral edge disposed on the lateral side.

8. The method according to claim 7, further comprising:
acquiring the internal support layer by die cutting a portion of a flat blank of TPU plastic material.

9. The method according to claim 7, further comprising:
acquiring the internal support layer by heating a powder composition to form a unitary solid structure that is planar.

10. The method according to claim 7, wherein the plurality of first material layers includes an inner fabric layer, a first foam layer, and a reinforcing fabric layer.

11. The method according to claim 10, wherein forming the first package of combined layers further comprises:
hot melt laminating the inner fabric layer to a first side of the first foam layer to form a third package of combined layers; and
compression molding the third package of combined layers with the reinforcing fabric layer to form the first package of combined layers and such that the reinforcing fabric layer is disposed on a second side of the first foam layer.

12. The method according to claim 10, wherein the plurality of second material layers includes an external fabric layer and a second foam layer.

13. The method according to claim 12, wherein forming the second package of combined layers further comprises:
hot melt laminating the external fabric layer to a first side of the second foam layer to form a fourth package of combined layers; and
compression molding the fourth package of combined layers with the internal structural support layer to form the second package of combined layers and such that the internal structural support layer is disposed on a second side of the second foam layer.

14. The method according to claim 7, wherein the second upper structure contains a top edge and an opposite bottom edge, and the internal structural support layer includes an upper edge and an opposite lower edge.

15. The method according to claim 14, wherein, when compression molding the second upper structure, the lower edge of the internally structural support layer is aligned with the bottom edge of the second upper structure, and the upper edge of the internal structural support layer is spaced from the top edge of the second upper structure.

16. The method according to claim 7, further comprising:
coupling the medial edge of the first upper structure to the medial edge of the second upper structure via a first bridge element and coupling the lateral edge of the first upper structure to the lateral edge of the second upper structure via a second bridge element.

17. The method according to claim 1, wherein the removing a first upper structure from the knit structure further comprises:
removing a plurality of patterned upper structures from the knit structure, each patterned upper structure including a medial side, an opposite lateral side, a medial edge disposed on the medial side, and a lateral edge disposed on the lateral side, each patterned upper structure being removed from the knit structure so that the first degree of elongation extends along a direction spanning from the medial side to the lateral side;
wherein one of the patterned upper structures is utilized as the first upper structure to be coupled with the second upper structure.

18. The method according to claim 17, wherein removing the plurality of patterned upper structures from the knit structure further comprises:
providing a plurality of pattern markers on the knit structure that define the plurality of patterned upper structures; and
laser cutting the plurality of patterned upper structures along the plurality of pattern markers.

19. The method according to claim 17, wherein removing the plurality of patterned upper structures from the knit structure further comprises:
die cutting the plurality of patterned upper structures based on an alignment of die cutting components with the knit structure.

\* \* \* \* \*